(12) United States Patent
Collender et al.

(10) Patent No.: US 7,180,663 B2
(45) Date of Patent: Feb. 20, 2007

(54) 3D MOTION PICTURE THEATRE

(76) Inventors: Robert Bruce Collender, 709 Patterson Ave., Glendale, CA (US) 91203-1044; Michael Arthur Collender, 18306 W. Buckboard Rd., Medical Lake, WA (US) 99022

( * ) Notice: Subject to any disclaimer, the term of this patent is extended or adjusted under 35 U.S.C. 154(b) by 0 days.

(21) Appl. No.: 10/174,256

(22) Filed: Jun. 19, 2002

(65) Prior Publication Data
US 2003/0234909 A1    Dec. 25, 2003

(51) Int. Cl.
G03B 21/10    (2006.01)
G03B 21/56    (2006.01)

(52) U.S. Cl. .......................... 359/451; 359/478; 353/10

(58) Field of Classification Search .................. 353/7, 353/10, 94, 13, 28, 50, 71, 122, 69, 98, 11; 359/456, 458, 460, 443, 449, 451, 454, 459, 359/462, 477, 478, 479; 348/744, 51, 52, 348/59; 352/57, 60, 61, 65
See application file for complete search history.

(56) References Cited

U.S. PATENT DOCUMENTS

| | | | | |
|---|---|---|---|---|
| 1,157,154 A | * | 10/1915 | De Falco | 359/448 |
| 3,295,910 A | * | 1/1967 | Hourdiaux | 359/451 |
| 3,311,017 A | * | 3/1967 | Eckholm | 396/429 |
| 3,357,769 A | * | 12/1967 | Thompson | 353/43 |
| 3,432,219 A | | 3/1969 | Shenker | |
| 3,469,837 A | * | 9/1969 | Heilig | 472/60 |
| 3,580,978 A | * | 5/1971 | Ebeling | 434/43 |
| 3,712,708 A | * | 1/1973 | Brown | 359/459 |
| 3,784,742 A | * | 1/1974 | Burnham et al. | 348/123 |
| 4,089,597 A | | 5/1978 | Collender | |
| 4,167,311 A | * | 9/1979 | Pund | 353/99 |
| 4,348,187 A | * | 9/1982 | Dotsko | 434/44 |
| 4,500,163 A | * | 2/1985 | Burns et al. | 359/15 |
| 4,537,474 A | * | 8/1985 | Astero | 359/718 |
| 4,547,050 A | | 10/1985 | Collender | |
| 4,676,613 A | | 6/1987 | Collender | |
| 5,253,116 A | | 10/1993 | Lacroix | |
| 5,566,370 A | | 10/1996 | Young | |
| 5,673,145 A | * | 9/1997 | Wilson | 359/449 |
| 5,717,453 A | * | 2/1998 | Wohlstadter | 348/46 |
| 5,822,928 A | * | 10/1998 | Maxwell et al. | 52/8 |

(Continued)

OTHER PUBLICATIONS

Meaning of Screen, hyperdictionary, http://www.hyperdictionary.com/search.aspx?define=screen, printed on Jan. 27, 2006.*

Primary Examiner—W. B. Perkey
Assistant Examiner—Andrew Sever

(57) ABSTRACT

When any observer receives an image of a scene having the same relative size, shape and location on the retina of each of his two eyes at any instant and the image of the scene has some component of horizontal motion in any direction, the image viewed is three dimensional. If the motion occurs, all scene-object points are spatially located in playback since all of the original ray angles between camera and scene points are reproduced for both eyes by the ray cross-overs at the scene image points. When successive frames are presented, the brain cognizes the motion in linking the frames by persistence of vision. For the brain to perceive an item as moving it must connect these frames, but because of intersecting rays coming from any spatial location in successive frames, the brain cannot connect the frames without also locating the points in space.

22 Claims, 11 Drawing Sheets

U.S. PATENT DOCUMENTS

| | | | |
|---|---|---|---|
| 5,825,538 A * | 10/1998 | Walker | 359/451 |
| 6,042,238 A | 3/2000 | Blackham | |
| 6,141,034 A * | 10/2000 | McCutchen | 348/36 |
| 6,164,018 A * | 12/2000 | Runge et al. | 52/8 |
| 6,292,157 B1 * | 9/2001 | Greene et al. | 345/1.3 |
| 6,407,798 B2 * | 6/2002 | Graves et al. | 352/69 |
| 6,511,182 B1 * | 1/2003 | Agostinelli et al. | 353/7 |
| 6,733,136 B2 * | 5/2004 | Lantz et al. | 353/79 |
| 6,735,015 B1 * | 5/2004 | Blackham | 359/451 |
| 2002/0149752 A1 * | 10/2002 | Courchsene | 353/122 |

* cited by examiner

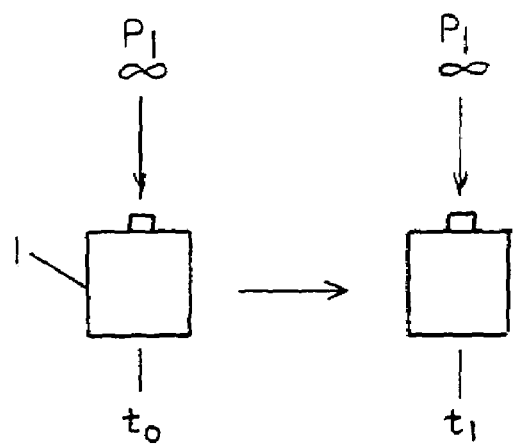
FIG·1
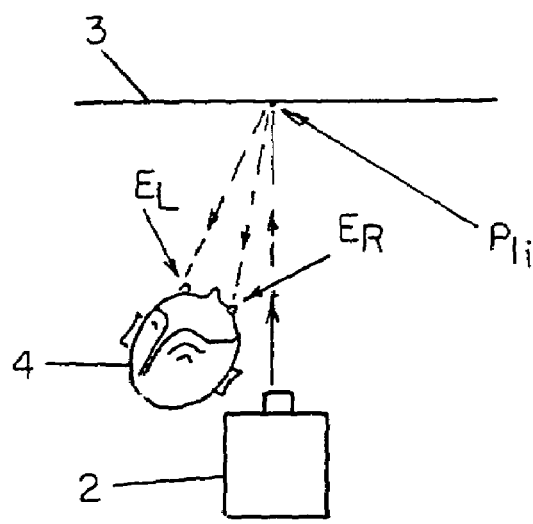
FIG·2
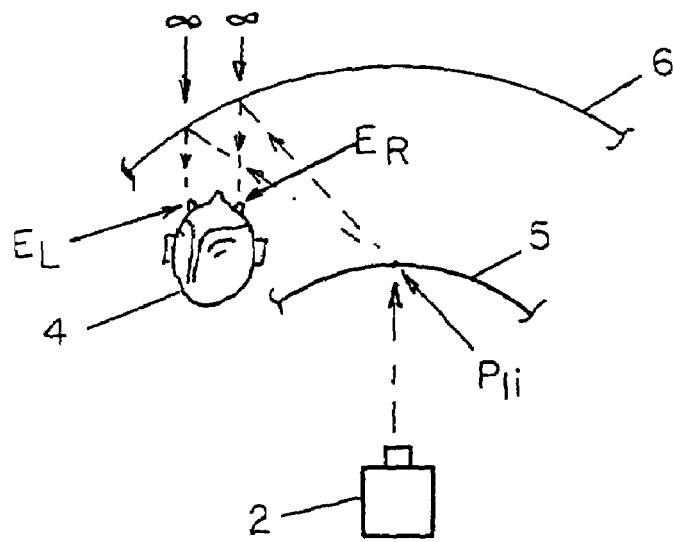
FIG·3

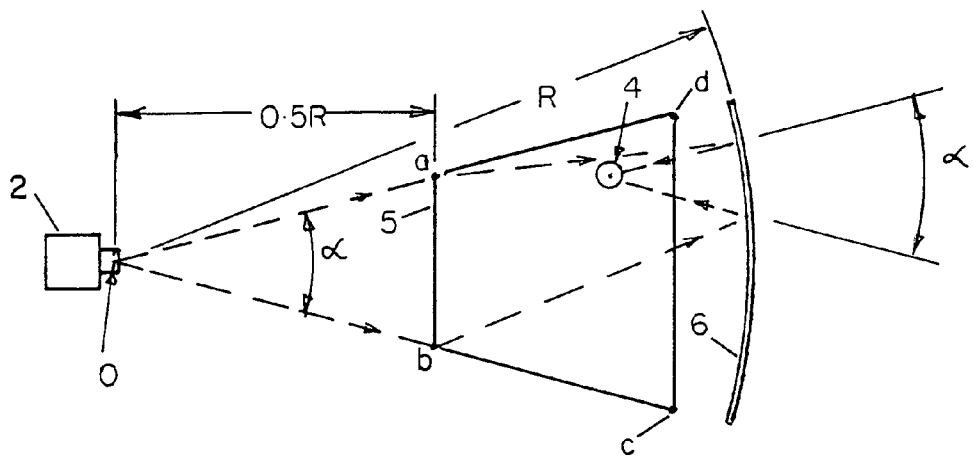
FIG·7A
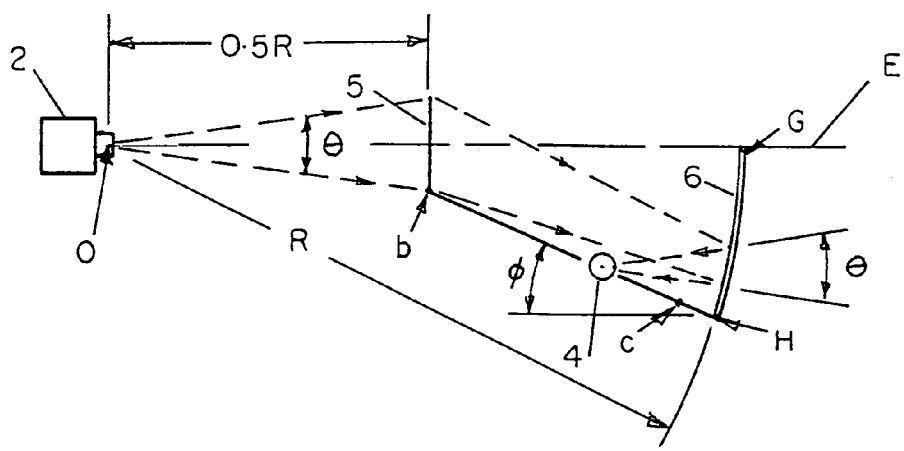
FIG·7B
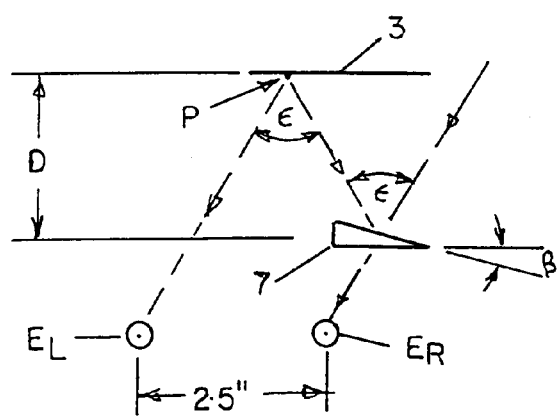
FIG·8

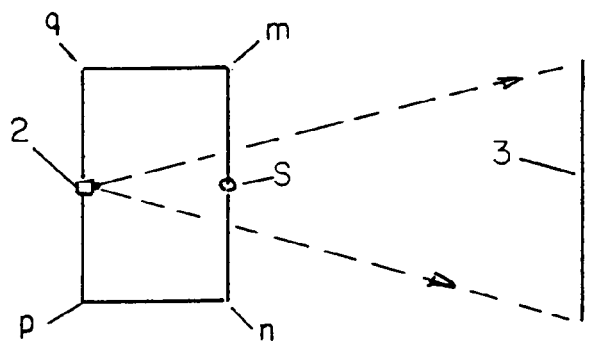
FIG. 9A
FIG. 9B
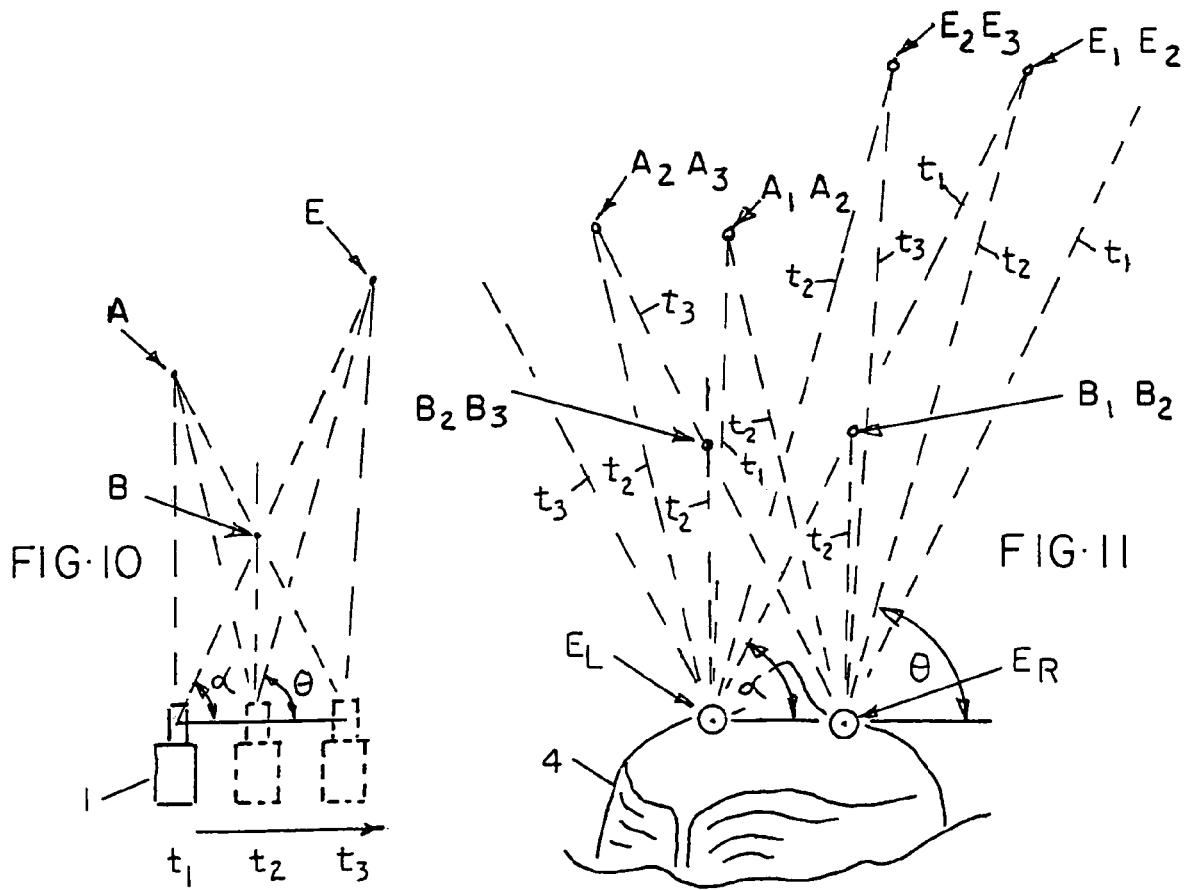
FIG. 10
FIG. 11

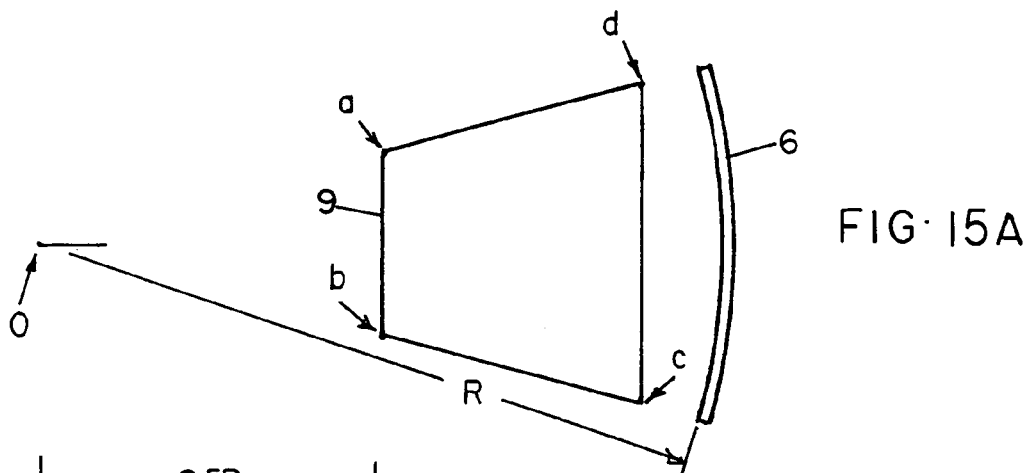
FIG·15A
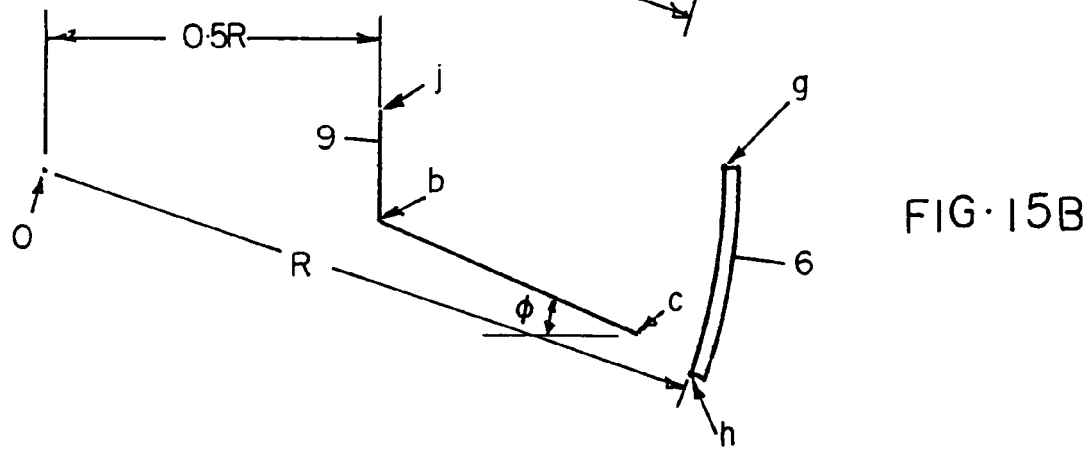
FIG·15B
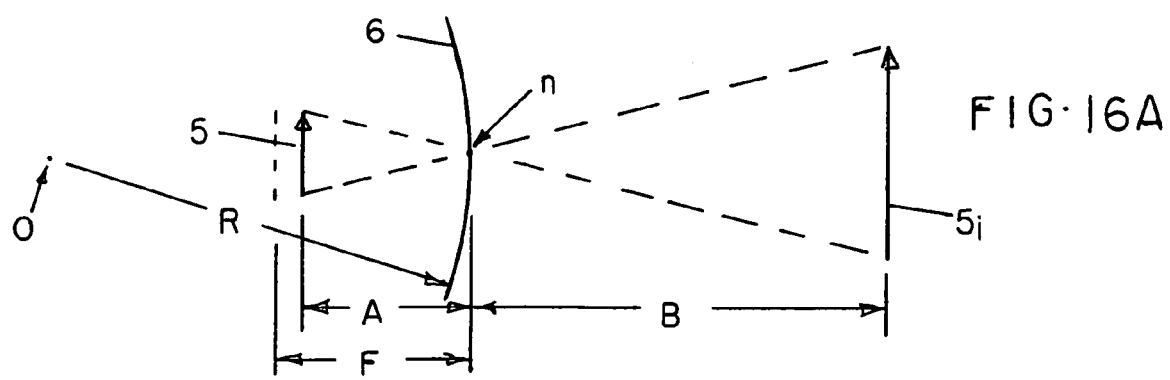
FIG·16A
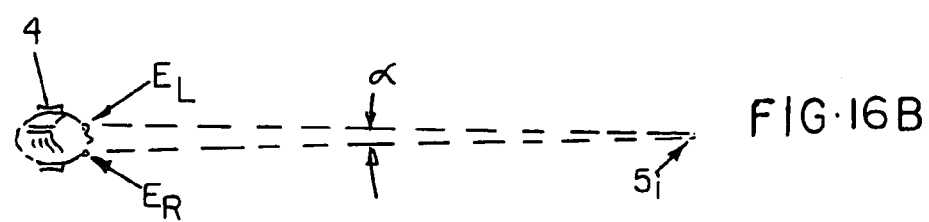
FIG·16B

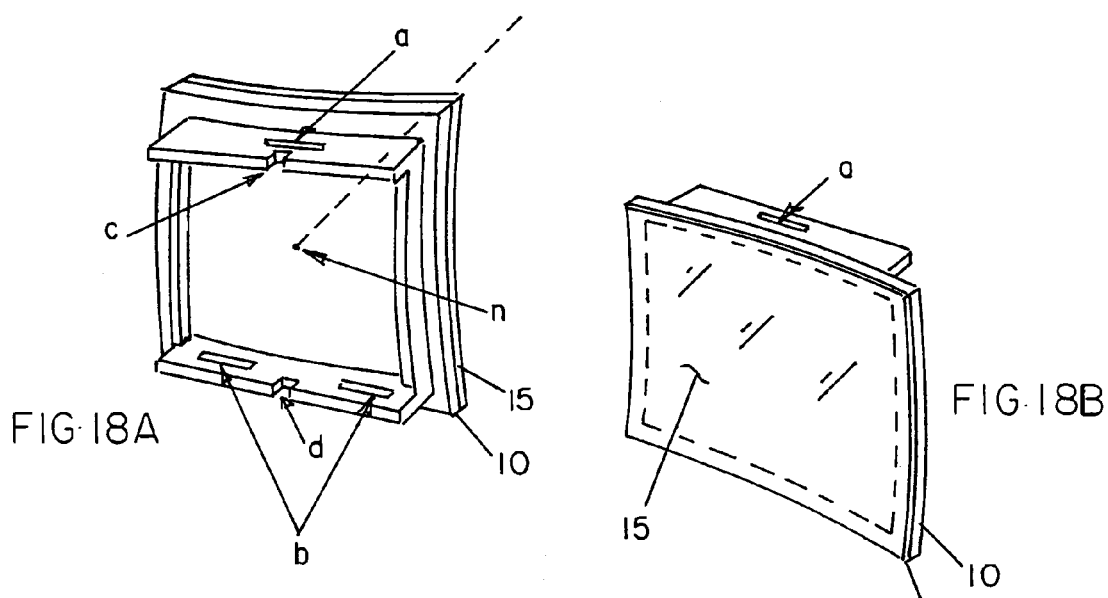
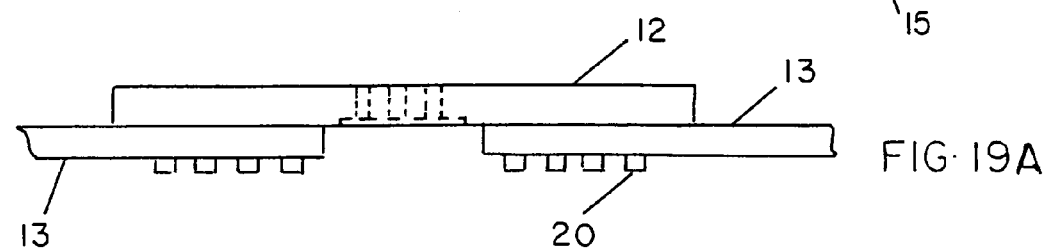
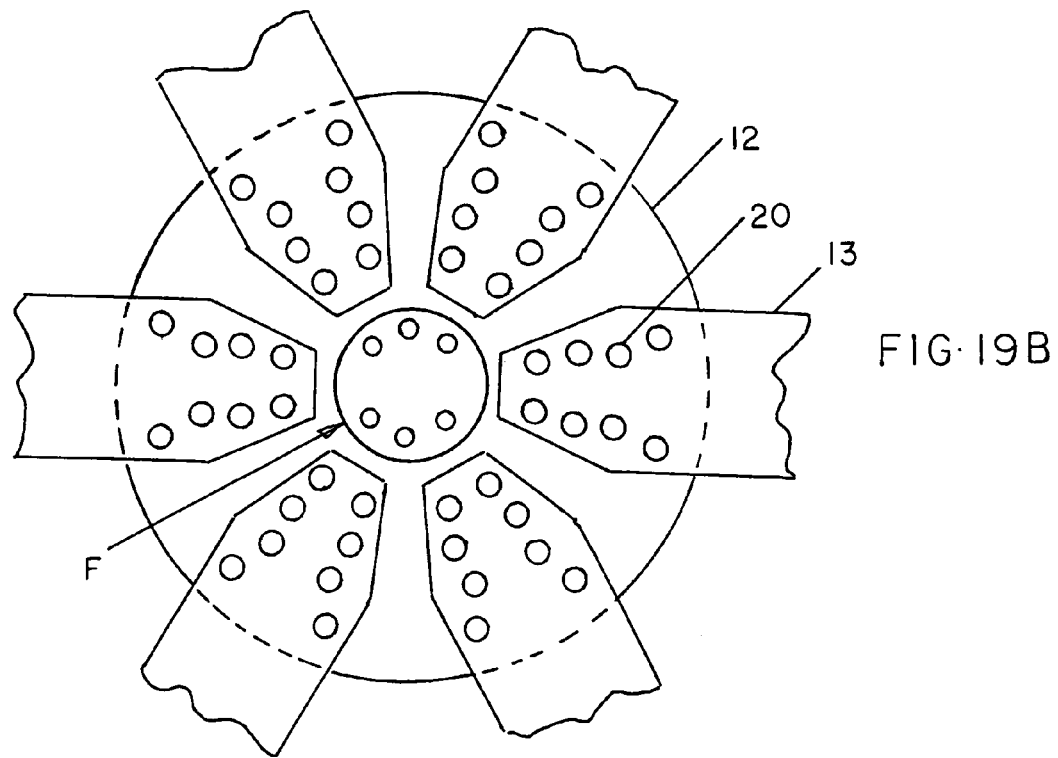

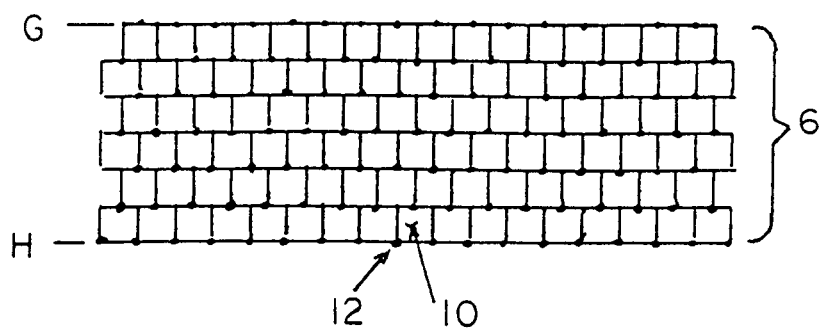
FIG·20
FIG·21A
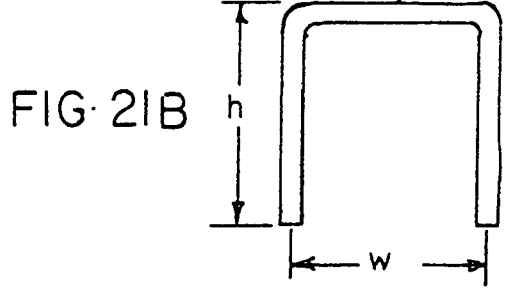
FIG·21B
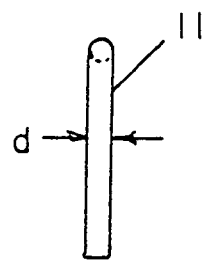
FIG·21C
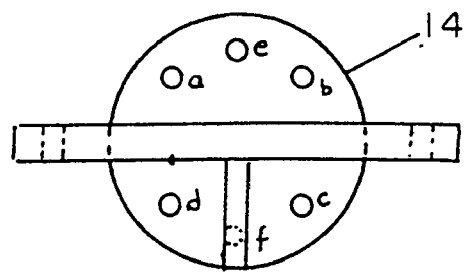
FIG·22A
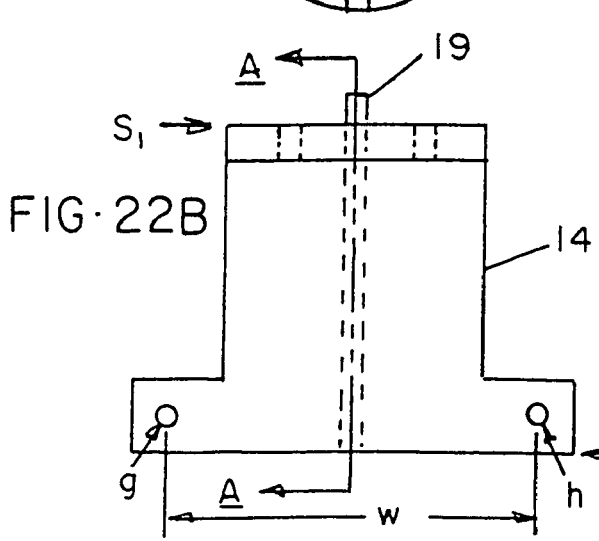
FIG·22B
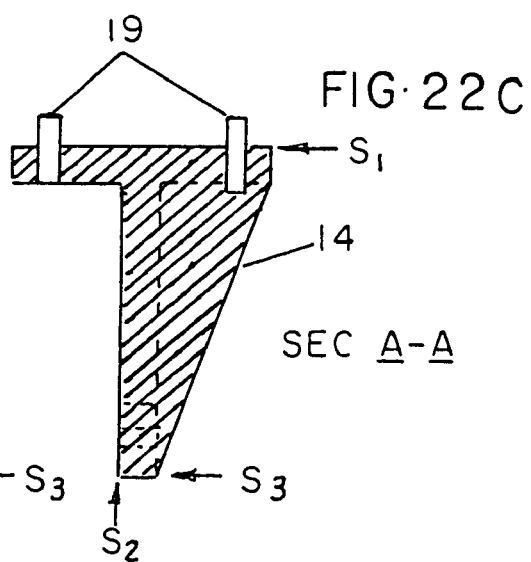
FIG·22C
SEC A-A

3D MOTION PICTURE THEATRE

CROSS REFERENCES TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Lenticular Systems

The history of 3-D technology without glasses that reproduce scenes in motion essentially begins with F and H. Ives in the 1930's with the use of lenticules and film camera/projector arrays. The reproduction system suffered from parallax discontinuities, shallow depth of field and the need for multiple projection lamps.

In the 1940's, Ivanov, in Russia, demonstrated the radial raster stereoscreen constructed of about 3000 long conical lenses imposing very tight tolerances in implementation. Special visors had to be designed to help spectators locate the best view positions. The Russians admitted to the following problems: visual fatigue due to poor left and right eye separation and brightness differences; poor convergence and the appearance of "cardboard" images.

Lenticular 3-D displays use vertical elongated lenses (the height of the view screen) and selective vertical lines from several images. This approach suffers a loss of horizontal detail and is very susceptible to jitter demanding an extremely accurate scan.

Varifocal Mirror

The varifocal 3-D system used a rapidly vibrating reflective membrane to cause a flat image to move through a minimum depth and rapidly repeat. The system could not provide a detailed photographic-type image due to a severely limited image writing time constraint.

Barrier Strip

The barrier strip system used a "picket fence" array of vertical narrow slats running the height of the screen and having a narrow space between each slat. The slats were arranged near to and in front of the view screen so that observer's right and left eyes could not see the same areas of the view screen at the same time. Right and left scene information (in narrow vertical areas behind the slats) presented 3-D to eyes in special places. The system reduced the brightness and the horizontal resolution of the scene.

In France, F. Savoye demonstrated the "Cyclostereoscope" (a type of "barrier strip" system) by projecting two pictures through a very large revolving truncated drum of spaced slats onto an internal stationary reflective screen to a theater audience of 90 observers in the 1940's. Observers looked through the spaces between the revolving slats as the large drum of slats rotated. Observers had to stay within the tiring lateral confines of about 1.5 inches. The 3-D effect offered good resolution but with reduced brightness.

LCD Vertical Shutter

This type of 3-D display uses electronically controlled multiple narrow vertical LCD slats to selectively pass or block light. The elongated slats are arranged side by side in a vertical plane surface between a "bright" screen and the observer's eyes. The slats are a few inches in front of the screen. The concept requires a very bright screen due to the LCD slat aperture duty cycle and low throughput in the "on" mode. The images are usually only simple computer graphics figures due to the high scanning speeds required in this process. The concept is similar to the "Stereoptiplexer" of the 1970's except that conventional movies were captured by a horizontally moving relative motion camera/scene which generated 3-D movies without glasses by means of a fast moving "aerial" slit in a rotating mechanism. The advantage of the Stereoptiplexer over the LCD system was that a means was found to bring all of the light from the screen to the "aerial" slit and thus eliminate considerable light loss. The height of the aerial slit was several feet so a very wide vertical view angle was allowed. Pictures from standard 16 mm film arrived at the conventional speed of 24 frames per second but were projected internally in the system to 2000 frames per second by an internal scanner. The problem with the Stereoptiplexer was that the camera was constrained to look out only one side as it moved horizontally. The Stereoptiplexer was described in U.S. Pat. No. 4,089,597 dated May 16, 1978 and was invented by one of the inventors of the current patent application.

Flickering 3-D Methods

R. McElveen of South Carolina (an optometrist), has shown 3-D movies by alternating left and right eye pictures at low refresh rates but flicker was intolerable and the effects were difficult to sustain.

VISIDEP was another flickering 3-D system which was developed by three professors at the University of South Carolina. They used two cameras displaced vertically and then electronically switched between them at a 5 Hz rate. The effects were very poor and caused much eye strain.

LASER Activated Omni-View Wobble Plate

Texas Instrument's reflective disc attached at an angle to a motor shaft spinning at 10 r/s was selectively illuminated by one or more modulated LASER beams which were synchronized with the spin rate. The resultant image was confined to a minimum volume (about 4 inches in size). The image was viewable from any position in a hemisphere. The system was not compatible with TV signals but showed only simple graph shapes. The flicker is not tolerable unless the spin rate is about 6 times greater. Larger full color system would require multi-LASERS accurately located and timed and a disc spin rate of at least 60 r/s.

Holography

In the early 1980's Komar of Russia used the principle of holography to present 3-D pictures without glasses. Komar provided a special reflective holographic screen that worked like a multiple ellipsoid. The projector was at the common focus of the ellipsoids and there were as many ellipsoids as observers. Each ellipsoid had a second focus at the observer's eyes. It is reported that four exit pupils with a 3×4 foot monochrome picture was demonstrated. The exit pupils at each seat were about 10 inches wide and resembled invisible "port holds" through which an observer viewed the scene-image with camera/scene proximity. Seats had to be specially located.

MIT's Media Lab-Holographic Video

A holographic moving picture was presented by MIT's Media lab in 1990, containing a simple wire frame graphic image a few inches high and requiring the bandwidth equivalent of 160 television channels. The demonstration image had a low resolution of 64 lines and refreshed at 40 Hz providing a limited 15 degree view angle. The system only provided horizontal parallax which was done to limit the bandwidth. If a full color TV image (running at standard TV rates and having 24 bits/pixel) was shown on their system, the bit rate would be 36 trillion bits per second. In their system, light passes through a tellurium dioxide crystal (which must be the full size of a viewing screen in a practical system and was only a few inches in size at that time) where a varying voltage was translated into a varying phase of light beam to produce a hologram in motion.

3-D Systems Without Glasses During the Decade—1990 to 2000

Dimension Technologies built a transmissive high resolution display with a rear thin vertical light source to direct left and right eye information to a few people.

Infinity Multi Media built a high speed CRT with liquid crystal shutter and projection lens using a Fresnel lens to create several viewing zones. The system had a narrow view field. It was an electronic version of the mechanical Stereoptiplexer.

NYU used a retro reflective camera-based eye tracking system to scan the view area for left and right eyes and to direct, via a computer control, appropriate images to the eyes (presently for a single viewer but may be expanded).

DDD (Dynamic Digital Depth) can use multiple cameras or a single camera and synthesize data for the other eye via computer coded information or can scan a scene with a LASER range finder and apply to the final picture. 3-D results are good but from zoned areas of view only. They are reporting that 3-D without glasses can be geneated from any DVD movie. In this technology, the audience size is relatively small (i.e., it will not work for theater applications).

General Comments on the Above 3-D Systems Relative to Our Invention

All 3-D systems without glasses to date, suffer from various problems: minimum depth of field; constrained eye regions within the view area; flicker; high bandwidth; small image size; low brightness; poor resolution; tight equipment alignment tolerances; not compatible with standard motion picture software, video or standard TV; and difficult to scale up to theater size.

Our 3-D without glasses invention will provide: high brightness; high resolution; a deep depth of field without flicker; 3-D images to all members of a large audience (probably up to 500 people) without any special zoned areas of view. Also, not like the barrier systems, the head can be held in any position, even upside down and still perceive the 3-D effect as in nature. Our invention is directly compatible with existing movie software. The only limitation of our invention is in the need for relative horizontal motion between the camera and scene in any direction. The system will be described in detail in the Specification.

BRIEF SUMMARY OF THE INVENTION

Our new invention has some of the elements of aircraft flight simulators for collimating the image appearing on a screen in the concaved mirror's focal sphere. Such a system is practiced by SEOS Displays Limited in the United Kingdom and other places around the world.

In aircraft flight simulators, the optics demand that the observers sit very near the center of curvature. The mirror size for the aircraft flight simulator is relatively small and is constructed of either a reflective foil in a controlled vacuum box or is assembled from a few concaved glass mirrors each about 8 feet high. Aircraft flight simulators must merely place a computer graphics picture in the view field (about 225 degrees wide by 40 degrees high). Because of this optical configuration, only a few viewers (a pilot and copilot) can see an image without distortion.

By contrast, our new invention expands the collimation to hundreds of observers who sit nearer to the mirror. To achieve this, the view angle is considerably reduced to approximately 30 degrees by 17 degrees and the mirror size for a 200 seat theater (the test theater size for our first system) is about 52 feet wide by 26 feet high and is constructed by piecing together many smaller mirror tiles. Because of the narrower angles, we can use a "flat" screen (either rear or front projected). In addition, our invention details a means to attach molded mirror tiles (without perceptible border lines) very accurately to a geodesic structure so that any number of mirror tiles can be small enough to be conveniently handled and placed into the large concaved mirror as a matrix of mirror tiles to make a concaved mirror of almost any size.

Also, by contrast with simulator technology, our new invention applies the properties of a moving image received nearly identically by the left and right eyes of any member of an audience (in the viewing space) to generate 3-D motion pictures without the need for glasses. Our invention requires an identical image on the right and left eye of all observers in the theater at nearly the same instant in time and to change this image by a succession of moving images resulting from a relative horizontal motion of the scene and camera in any direction and at a rate consistent with persistence of vision.

Currently, with existing movies, a screen is placed in front of the observers (at a finite distance), on which the viewed image appears. The picture is flat (2-dimensional). The main depth cues are: relative rates of movement for objects at different distances in space with movement of the camera (i.e., some objects passing behind others); the diminishing size of a receding object or the increasing size of an object approaching the camera; and the use of color. The problem is that the observer's eyes do not converge differently for objects at various depths in the scene as they do in nature.

To solve the problem and bring the reality of depth or 3-dimensions to the scene (without glasses), our new system depends on some component of horizontal relative motion between camera and scene. Successive views of the scenes captured by the camera provide a "look around" feature while the camera or scene-objects move left, right, forward or backward relative to each other. In addition, instead of the screen being placed at a finite view-distance, we "effectively" move it to infinity so that both eyes see exactly the same image (as though looking at distant mountains). If no relative motion is present the scene will appear outside the reach of depth cues (as—when one looks at distant mountains), but it turns to spectacular 3-D (without glasses) when this motion is present. Even if the camera was stationary, if a component of horizontal motion occurred anywhere in the scene, that element in the scene will also be in 3-D.

There are other benefits to an infinitely distant screen, such as: every eye in the viewing area sees exactly the same thing (all looking parallel to one another); everyone sees the scene as though their eyes were at the camera's lens; all eyes see the same resolution and therefore an HDTV projector can replace cumbersome film projectors; no one sees the kind of distorted picture as an observer would see viewing a conventional display up close but way to one side and above or below the screen's center.

The means to achieve a distant screen in a practical way is to start with a screen "behind" the audience and image it to infinity by a collimating spherically-concaved mirror in front of the audience (similar to the—way it is done in aircraft flight simulators for only a few people, but in those simulators, only a few viewers are nearer the center of curvature of the mirror than in the method we propose and the angle of view is 7.5 times wider than for our system An important objective in the development of our invention was to survey industry for the purpose of finding an optimum concaved mirror technology that would allow a mirror to be constructed 25 feet high or even higher by means of piecing together a matrix of mirror tiles to provide high image quality and low procurement cost. This survey was accomplished. We evaluated 17 technologies and a total of 58 companies. The result led to a molded part with a reflective layer glued to its surface. The mirror-tile is then LASER trimmed to the exact shape to fit nearly seamlessly into a geodesic structure.

We have been successfully testing the concept on a 1/32nd scale model of one of our 3-D (without glasses) embodiments employing moving images from a standard video camcorder. The recorded images made on the camcorder were played back into a standard television set located in the focal surface of the concaved mirror. Images vary in space from infinity up to the observer's eyes (the effect is like looking through a View-Master Stereoscope).

We have also constructed a pair of glasses that accomplishes the same purpose by putting a wedge prism over one eye. Since 1989 we have evaluated the 3-D results in movie theatres and from TV screens showing 2-D movies but we viewed them in 3-D whenever the relative motion occurred. In the glasses system, collimation can be "effectively" created by the use of special view-glasses that horizontally divert rays entering one eye so that the retina of each eye (left and right) receives the exact image in the same position, size and shape that it would be in if both eyes were viewing a single collimated image or even a very large screen at a great distance from the observers. This can be achieved by an adjustable or fixed wedge prism over one of the observer's eyes.

The following partial list shows camera/scene relationships that have been tested and appear in three dimensions either without the need for observers to wear glasses (as in the concaved mirror test) and with the need for glasses (as in the glasses test methods of the prism wedge over one eye):

1. Camera moving in any direction (with a component of horizontal motion) and with objects both stationary and moving in all directions relative to the camera: walking with camera; camera in car; camera on bicycle; camera in helicopter; camera on surfboard; camera on snow skies; camera on a roller-coaster; camera carried along underwater by swimmers or vehicles.
2. Camera stationary and scene objects moving with any component of horizontal motion relative to camera: merry-go-round; on bridge overlooking traffic going in both directions; at a train station with people walking in all directions; at the beach looking at the waves and water washing to shore with people walking by and dog playing in the sand; surfing; smoke or dust plumes; dancing; players in basketball game; parades; sparks from a welder's torch.

Many, if not most scenes in old and new movies are in three dimensions because of the relative camera/scene motion.

Since it is undesirable for movie-goers to wear special glasses and have to adjust them to their particular seat to screen distance and it is also impractical to build theatres with huge screens and great viewing distances, a compromise theatre design is proposed.

In the proposed theatre, it is desired to retain a stadium seating arrangement (to allow all spectators to see the show without interference by the person's head in front of them) and to present every theatre seat location with essentially distortionless viewing and to provide 3-D without glasses whenever some component of relative camera/scene horizontal motion occurs using existing standard software. It is also desirable to provide 3-D multiplex theatres with a seating quantity equivalent to current theatres.

The screen can either reflect or transmit projected light or can be a flat panel light emitting surface that does not require a projector. In our invention using the collimating principle of a large concaved mirror, the theatre walls grow wider toward the front of the auditorium (a trapezoid seating area). All seats are parallel to one another and all eyes view the picture while looking in the same direction (i.e., as though the picture originated at infinity). A person coming down the aisle with his popcorn/drink will continue to see smooth 3-D (without glasses) all the way to his seat. There are no alternating zones of perturbed information. The observer's head can be oriented at any angle with respect to the mirror's image (i.e., he can even stand on his head and still see 3-D—without glasses). All observers in the audience (close to or far from the collimating means) while looking parallel to each other and straight ahead—see the image of the scene in a manner similar to the way the original camera saw the scene (but with 3-D added without the need for glasses of any sort).

BRIEF DESCRIPTION OF THE SEVERAL VIEWS OF THE DRAWINGS

FIG. 1 shows a movie camera (using film or electronic storage media) moving laterally while capturing views of a scene at great distance.

FIG. 2 shows the far image viewing geometry in a plan view of a conventional movie projection system where the views from FIG. 1 camera are projected onto a reflective screen.

FIG. 3 shows the far image viewing geometry in a plan view of one embodiment of a movie projection system (using film or electronic storage media) where the views from FIG. 1 camera are projected onto a screen in the focal surface of a concaved mirror.

FIG. 7A is the plan view of the viewing parameters for one embodiment of a large audience projection system where the projector is at the center of curvature of a concaved mirror and the screen in the mirror's focal plane is a rear projection type.

FIG. 7B is the side elevation view of the system of FIG. 7 A.

FIG. 8 shows a plan view of a 3-D glasses system embodiment using a wedge prism over one eye that gives the same result as the audience view in FIG. 7

FIG. 9A shows a plan view of an alternate collimating 3-D viewing embodiment in which the viewing screen is at a great distance from the viewer.

FIG. 9B shows a side elevation view of FIG. 9A.

FIG. 10 shows a plan view of three scene points and a single movie camera capturing scenes at three positions along its path of movement.

FIG. 11 shows a plan view of an arbitrary observer receiving collimated light in his left and right eyes from the direction of each image point in the scene captured by the camera of FIG. 10.

FIG. 15A is another embodiment of a large audience viewing system similar to FIGS. 7 & 14 except the screen is made of electronically controlled picture elements that either emit or modulate scene light.

FIG. 15B is a side view of FIG. 15A.

FIG. 16A shows the concaved mirror optics.

FIG. 16B shows an observer looking at the nearest image of the screen in the collimating mirror that would be allowed in the viewing system.

FIG. 18A shows a back view of one of the mirror tiles used in the concaved mirror.

FIG. 18B shows a front view of the mirror tile shown in FIG. 18A.

FIG. 19A shows a plan view of the aluminum gusset (Node) with attached struts.

FIG. 19B shows a front view of the aluminum gusset (Node) with attached struts.

FIG. 20 shows a front view layout of attach points (nodes) on all of the mirror tiles in a geodesic structure for the 200 seat theatre.

FIG. 21A shows the top view of the U-Pin.

FIG. 21B shows the side view of the U-Pin.

FIG. 21C shows the end view of the U-Pin.

FIG. 22A shows a front view of the Diving Board.

FIG. 22B shows a plan view of the Diving Board.

FIG. 22C shows a side view of the Diving Board.

DETAILED DESCRIPTION OF THE INVENTION

Figure 4:
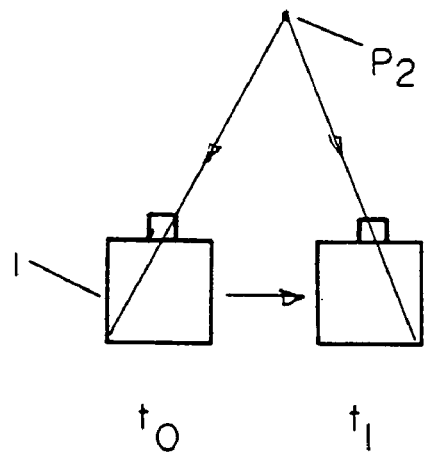
FIG. 4 shows a movie camera (using film or electronic storage media) moving laterally while capturing views of a scene close to the camera.

FIG. 1 shows a movie camera 1 (using film or electronic storage media) moving with a component of horizontal relative motion (between camera and scene) while capturing views of a scene at great distances. $P_1$ represents an object point in the scene at infinity. Camera 1 is shown at two points in time designated by time $t_0$ and time $t_1$ at which times scene point $P_1$ is recorded on the storage media used in camera 1. The views thus captured become images in the successive embodiments of the playback equipment discussed in the remainder of this specification.

FIG. 2 shows the far image viewing geometry in a plan view of a conventional movie projection system (using film or electronic storage media) where the view captured in FIG. 1 is projected by projector 2 onto reflective screen 3 and image point $P_{1i}$ is viewed by observer 4. Observer 4 sees $P_{1i}$ on screen 3 with left eye $E_L$ and right eye $E_R$ and the sight lines from eyes to screen image are not parallel as they were for camera 1 in FIG. 1. Thus, the FIG. 2 geometry does not faithfully reproduce the capture geometry of FIG. 1 for distant scene object points.

FIG. 3 shows the far image viewing geometry in a plan view of one embodiment of a movie projection system according to our invention (using film or electronic storage media) where the view captured in FIG. 1 is projected by projector 2 onto rear translucent screen 5 located in the focal surface of a spherical concaved reflecting mirror 6. Because of this geometry, an image collimator is formed. Point $P_{1i}$ on screen 5 is viewed by observer 4 in mirror 6 and appears as a virtual image. Observer 4 sees $P_{1i}$ at infinity with left eye $E_L$ and right eye $E_R$. Thus, the viewing geometry of FIG. 3 emulates the capture geometry of FIG. 1 for distant scene object points. Screen 5 is shown here as a curved screen for ease of illustration. However, in practical tests we have shown that a flat screen has advantages in our system.

FIG. 4 shows movie camera 1 (using film or electronic storage media) moving with a component of horizontal relative motion (between camera and scene) while capturing views of a scene containing an arbitrary point $P_2$ at close distance. Camera 1 is shown at two points in time designated by time $t_0$ and time $t_1$ at which times scene object point $P_2$ is captured on the recording media used in camera 1. The views thus captured become images in the successive embodiments of the playback equipment discussed in the remainder of this specification.

Figure 5:
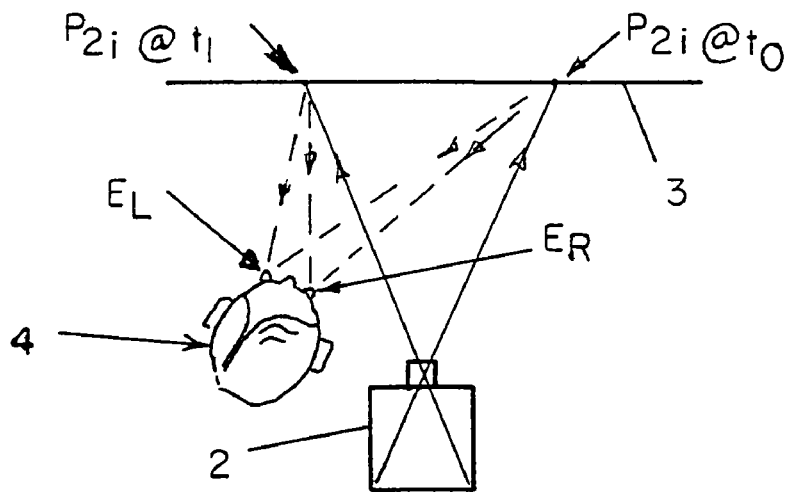
FIG. 5 shows the near image viewing geometry in a plan view of a conventional movie projection system (using film or electronic storage media) where the views from FIG. 4 camera are projected onto a reflective screen.

FIG. 5 shows the near image viewing geometry in a plan view of a conventional movie projection system (using film or electronic storage media) where projector 2 projects the views captured in FIG. 4 onto reflective screen 3. The images of object $P_2$ in FIG. 4 are designated $P_{2i}$ in FIG. 5 and are imaged sequentially on screen 3 at two distinct locations (one location for the image of $P_2$ captured at $t_0$ and one location for the image of $P_2$ captured at $t_1$). Observer 4 does not see the $P_2$ image in the relative location designated by the relative position of camera 1 and object $P_2$ of FIG. 4 but instead sees the two distinct flat images of $P_2$ at $P_{2i}$ for time $t_0$ and $P_{2i}$ for time $t_1$. The spatial location of the $P_2$ object of FIG. 4 is therefore not consumated by the conventional 2-D projection system of FIG. 5.

Figure 6:
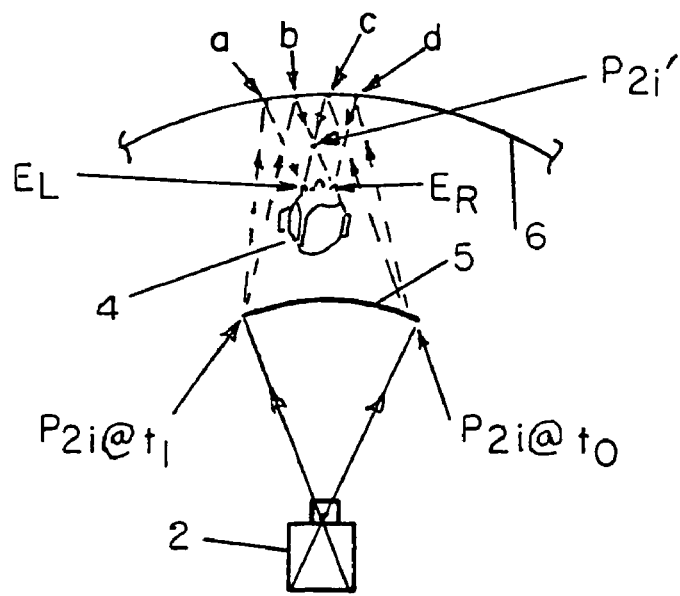
FIG. 6 shows the near image viewing geometry in a plan view of the same embodiment of a movie projection system as in FIG. 3 (using film or electronic storage media) where the views from FIG. 4 camera are projected onto a screen in the focal surface of a concaved mirror.

FIG. 6 shows the near image viewing geometry in a plan view of one embodiment, according to our invention, of an image generator consisting of a movie projection system 2 identical to FIG. 3 (using film or electronic storage media) where the views captured in FIG. 4 are projected by projector 2 onto rear translucent screen 5 (which is shown spherical but in our invention can be a flat surface because of relatively narrow viewing angles compared with flight simulators) located in the focal surface of spherical concaved reflecting mirror 6. Projected image point $P_{2i}$ is shown at two locations on screen 5 and represent captured object point $P_2$ at times $t_0$ and $t_1$ from FIG. 4. In FIG. 6, observer 4 with left eye $E_L$ and right eye $E_R$ sees the image of $P_2$ at $P_{2i}'$ by imaging screen 5 in mirror 6. Rays from a to $E_L$ and from b to $E_R$ are parallel to each other and rays from c to $E_L$ and from d to $E_R$ are parallel to each other. Rays from b to $E_R$ and from c to $E_L$ intersect at $P_{2i}'$, thus placing the image of $P_2$ in the same relative spatial location to observer 4 as the original object point $P_2$ was to camera 1 (in FIG. 4) in its excursion over time interval $t_0$–$t_1$. If only these two pictures were taken and continuously displayed, observer 4 would see a double exposure in FIG. 6 as the subdued image of $P_2$ appears along lines d to $E_R$ and a to $E_L$. Since camera 1 of FIG. 4 continuously moves, and the cross-over of ray b to $E_R$ with ray c to $E_L$ are stronger reinforcements, the series of pictures thus formed eliminate all double exposures and blend into an accurate rendition of the original scene in realistic 3-dimensions without the need for observers to wear glasses as the working model of our invention proves.

FIG. 7A shows a plan view of the proposed 200 seat theatre viewing geometry. Our invention can use much greater or even less seating capacity but 200 was chosen as a reasonable start point to build a test theatre. In the plan view, the standard motion picture is projected by projector 2 onto screen 5 and the audience seated in trapezoid area "abcd" looks away from screen and toward the large concaved mirror 6 (about 26 ft high by 52 ft wide for a 200 seat theatre) in front of the audience. The width of the audience area grows wider as they sit closer to the large mirror 6. The large mirror's 6 purpose is to reflect an image on screen 5 but also to move that image to near infinity (hence, collimate it). The horizontal view angle of every member of the audience is 30 degrees (measured at the eye shown as angle α in FIG. 7A) and selected as a maximum in order to avoid distortion of the picture. The nearest observer (in the bottom corner of the seating area at c or d) would be seated about 5 ft from mirror's 6 surface. The planned gap allowance between all of mirror tiles 10 (to be described later) 99 of which are used to construct the large size concaved mirror 6, is about one thirty second of an inch and that gap should be nearly imperceptible to the nearest observer. All of the observers will be looking parallel to each other and the center of the picture will be directly in front of each of the audience members represented by observer 4 within the specified audience viewing area "abcd".

FIG. 7B is a side view of the projection and viewing system of FIG. 7A. FIG. 7B is more complex in that it shows more clearly the locus of the audience eyes inclined to the horizontal (the standard stadium seating angle φ is about 23 degrees but other angles can be chosen) to avoid interference of any person's view of the picture caused by the person directly in front of him. The screen 5 occupies a vertical angle of 17.1 degrees measured from the center of curvature of mirror 6. Any aspect ratio (width to height) of picture can be displayed here as long as the maximum horizontal angle α of 30 degrees, shown in the FIG. 7A, is maintained. For a 200 seat theatre, the angle measured from the equator E to the mirror's top G is minus 2 degrees latitude whereas the angle measured from the equator E to the mirror's 6 bottom H is minus 16.9 degrees latitude. The bottom of mirror 6 at H is extended past 16.9 degrees to a value of 17.5 degrees latitude. This is done to allow a constant height of each of 6 rows of mirror tiles 10 (to be described later in FIG. 18A & B) that run from the top G to the bottom H of mirror 6. As long as mirror's 6 size occupies the physical space to intercept the expected one-half vertical views of 8.55 degrees both measured upward and downward from a horizontal reference center line for an included vertical view angle θ of 17.1 degrees maximum, all audience members will be satisfied. The top observer on the 23 degree (angle φ in FIG. 7B) incline will see the top of the picture at point G on mirror 6. The bottom observer on the 23 degree incline will see the bottom of the picture at point H on mirror 6. The radius R for mirror 6, measured from the center of curvature "o" is 100 ft for a 200 seat theatre. If the theatre were to grow to 460 seats, the value of R would increase to 150 ft but the viewing angles α and θ (both horizontally and vertically) would remain the same as for the 200 seat theatre.

Motion picture projector 2 in FIGS. 7A & 7B (using either film or electronic media) is projecting the scenes photographed by the camera 1 of FIG. 1 or FIG. 4 onto the rear projection screen 5. Screen 5 is shown flat as the collimating image of screen 5 in mirror 6 has minimal distortion for a flat screen due to the small horizontal view angle α of 30 degrees for each observer. A flat screen is cheaper to make than a compound curved one. A 30 degree horizontal view angle α is that angle subtended by the sides of a conventional movie theatre screen as measured at the optimum eye location near center theatre. It also corresponds with a frequently used camera capture angle. The audience view area is defined by the area encompassed by the letters abcd in FIG. 7A and is contained in a plane surface including points b and c of FIG. 7B inclined φ degrees (about 23 degrees for stadium seating). Within the view area, an arbitrary observer's 4 eye is shown viewing the collimated picture with approximately a 30 degree (angle α in FIG. 7A) horizontal view angle (shown in FIG. 7A) and approximately a 15 to 17 degree vertical view angle (shown as angle θ in FIG. 7B), depending on the desired picture aspect ratio (width to height).

Figure 12:
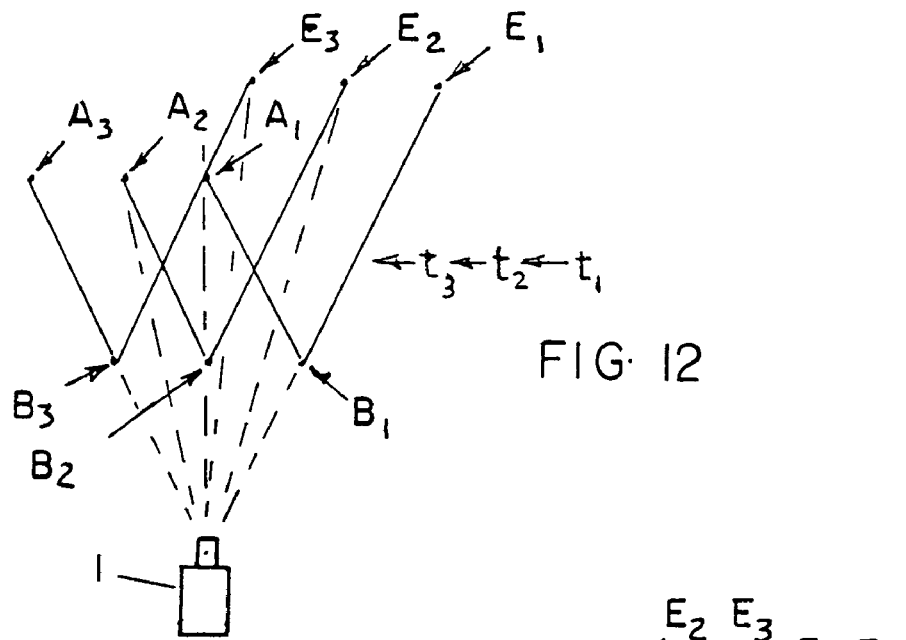
FIG. 12 shows a plan view of three scene points that maintain their relative position to each other while laterally moving together relative to a fixed movie camera where the camera captures scenes at three positions of the objects.

The geometry of image collimation by concaved mirror 6 using a picture in its focal plane (screen 5) is a very old idea and written into many old optics books. An example is John Strong's book "Concepts of Classical Optics" copyrighted 1958 by W.H. Freeman and Co., Inc. The drawing of the spherical concaved mirror's collimating properties with any image points on the focal surface of the mirror is shown on page 370 of the book (FIGS. 16–12). U.S. Pat. No. 3,784,742 of Jan. 8, 1974 by D. Burnham, et al, shows the principal for collimating light by this method for simulators (but Burnham's patent utilizes the same approach to collimation as described in Strong's 1958 book). This geometry for collimation is about as old as using a lens with the image at the focal plane of the lens in order to collimated the image as shown in several very old optics books. Even the method of collimating light by merely placing the viewing screen at a great distance is not new. It is written in books that depth is not observed beyond a certain distance. An example, is a book by A. W. Judge, "Stereoscopic Photography"—1950 Chapman and Hall, Ltd., page 26. What is new however in our invention, is the application of the properties of a moving image (having some component of horizontal relative motion between camera and scene) received as from nearly an infinite distance by the left and right eyes of any member of an audience (in the viewing space) to generate 3-D motion pictures or television without the need for glasses. The key is to have an identical image on the right and left eye of any given observer at the same instant in time and change this image by a succession of moving images resulting from a relative horizontal motion of the scene/camera and at a rate consistent with persistence of vision. This moving 3-D imagery occurs because of intersecting rays from successive frames in scene/camera relative motion during playback of the scene images. The brain does the remainder of the work through the agency of persistence of vision.

By presenting a succession of scene image frames derived from some component of horizontal camera/scene motion and by assuring that an identical image appears at nearly the same location on an observer's left and right eye's retina, the brain can cognize the depth information already contained in the successive frames, in the same way that it cognizes the motion contained in successive frames. The moving 3-D imagery occurs because of intersecting rays establishing a scene's location points from successive frames acquired during scene/camera relative motion in the playback of the scene image. When the successive frames are presented, the brain cognizes the motion in linking the frames by the persistence of vision. For the brain to perceive an item as moving it must connect these various frames, but because of intersecting rays (for any given point in space) coming from successive frames, the brain cannot connect the frames without also locating the points in space. We have made our system to generate 3-D images by making use of what happens in the brain "between the frames". When the same image is presented at different locations within the two eyes (as happens when the eyes toe in on standard television and movie systems) then the depth information contained in the difference between frames is lost.

There are a number of methods for constructing the large mirror of FIG. 7. One method such as U.S. Pat. No. 4,750,808 dated Jun. 14, 1988 by G. Nash, et al, uses a metallic foil such as aluminized polyester "Melinex" stretched over a vacuum chamber box with curved sides that follow the required screen curvature. An internal positioning sensor determines the vacuum pressure to keep the right curvature of the metallic foil. SEOS Displays Ltd., at Burgess Hill, West Sussex, U.K., makes flexible concaved mirrors several feet in size by a similar process for the flight simulators. Currently a reflective mylar sheet width is about 10 feet as an upper limit. In the future perhaps much larger thin film reflective sheets may be available. Another method for constructing the large mirror is to piece it together with a mosaic of cells (or mirror tiles 10 as this specification calls them). These mirror tiles 10 would take on the shape of the surface of a globe map of the world with the space between curved latitude and longitude lines as the mirror tile 10 shape. In addition, the mirror tiles 10 can be made identical using a common geometric shape. The spherical shape of any mirror tile 10 of the mosaic or segmented mirror matrix can be made by compression molded SMC (Sheet Molded Compound) material the way the roof of a car is made-only inverted as a concaved surface. This surface can have a reflective overlay attached to it as from a thin mirrored acrylic sheet. Another method for generating a sphere shaped mirror is to form stainless steel by use of a large punch and die or by stretch forming and then to mirror-polish. Another method would be to thermal/vacuum form mirrored plastic sheets.

In addition to the 3-D without glasses approach which we tested using the concaved mirror, we also tested the "effects" of the process in existing theatres (starting near the end of the 1980's while observing what portions of the movies give the 3-D results) using a special pair of glasses that collimate one eye to the unaided view of the other eye. The result is to make the theatre screen appear to be at infinity. FIG. 8 shows the glasses method to verify the same results obtained with the collimating mirror approach.

In the glasses system, collimation can be "effectively" created by the use of special view-glasses that horizontally divert rays entering one eye so that the retina of each eye (left and right) receives the exact image in the same position, size and shape that it would be in if both eyes were viewing a single collimated image. This can be achieved by a fixed or adjustable wedge prism over one of the observer's eyes.

In order to achieve the 3-D results with the implementation of FIG. 8, arbitrary point P on screen 3 must be seen with parallel sight lines from each of the two eyes ($E_L$ and $E_R$). Without wedge prism 7, the sight lines converge to P on screen 3 and there is no 3-D. With the wedge prism 7 over one eye (in this case, the right eye $E_R$ is shown with wedge prism 7 but it could have been the left eye $E_L$) the sight lines are rendered parallel and the 2-D moving picture on screen 3 turns into 3-D whenever there is a relative horizontal motion (left or right) between the camera/scene. The ray deviation angle is $\epsilon$. The wedge prism 7 angle is $\beta$ in order to result in a ray deviation of $\epsilon$ when wedge prism 7 has an index of refraction n. The formula for this relationship is: $\beta=\epsilon/n-1$ and $\epsilon=\tan^{-1}(2.5/D)$ where both 2.5 and D are given in inches.

FIG. 9 A & B shows an alternate image collimating embodiment of our invention where the physical screen 3 is placed about 700 feet away from the nearest observer S and is also made very large (say 25 times the area of current theatre screens so as to encompass a horizontal viewing angle of about 30 degrees). There will be several thousands of seats and the observer at each seat will see the picture as the camera saw it and the picture will appear in 3-D whenever there is some component of "relative horizontal motion" in any direction between camera and scene. The cost and power requirements for such a large screen are prohibitive. In the case of the distant screen (beyond 700 feet), the left and right eyes of the observers have nearly identical images formed on each eye's retina. It should be noted that an observer viewing a scene point at a distance off 716 feet will have his 2 sight lines subtend an angle of 1 minute of arc. If one minute of arc separates two vertical lines at the viewing distance and if the observer has 20/20 vision, he can barely resolve the two lines. Therefore, the screen or screen image should be at least 716 feet distance from observers. Since the screen image is collimated, all eyes in the viewing area will see the screen at the same distance.

FIG. 9 A & B show a plan and side view, respectively, of this embodiment in which a great distance is maintained (about 700 feet from screen 3 to the nearest observer S in viewing area mnpq). About 24,000 viewers can be seated in viewing area mnpq. The left and right eyes of any observer will see any point in the screen 3 image with about ½ arc minutes difference between each eye and so the image will be essentially collimated and appear to come from infinity. In practice, a projector 2 throwing a 523 foot wide by 295 foot high image onto screen 3 would take unheard of LASER power but could become practical with improved LASER development. An alternate method is to build the screen of a matrix of smaller multi-pixel light modulators (such as liquid crystal) so that back-light from the bright sky (about 2000 foot lamberts) would eliminate the need for high power. As an example, the audience could sit in an air conditioned room and look out at the distant screen (even in the desert). Screen 3 should have a very large black border around it to limit the direct sky light from striking the audience and thus reducing the effective image brightness.

FIG. 10 shows a plan view of three points (A, B and E) in the scene to be captured by a laterally travelling camera 1 (having film or electronic storage media). Camera 1 can be any motion picture or television camera that captures multiple pictures over an extended time interval. Camera 1 is shown at three locations along its path at three points in time ($t_1$, $t_2$ and $t_3$) corresponding to the times of occurrence for three successively captured frames of the scene. For reference, angles $\alpha$ and $\theta$ are given to help establish the geometry-shape and to correlate this shape with the playback imagery geometry of FIG. 11. The three frames are selected to make the explanation simple. Actually, there are as many points in time as there are frames in the movie or television capture rate.

In FIG. 11, the collimating nature of the invention described in FIG. 3, FIG. 6, FIG. 8 and FIG. 9 assures that any ray's direction from the three scene points to camera 1 in FIG. 10 (as camera 1 moves to each of the three locations in time), is maintained in playback for both eyes of any arbitrary observer 4 such as left eye $E_L$ and right eye $E_R$ as shown in FIG. 11. Any two rays corresponding to the same image point (as A, B or E from FIG. 10) will intersect and move to the left if camera 1 tracks to the right or move to the right if camera 1 tracks to the left. In FIG. 11, point $A_1A_2$ represents the spatial position of the image of point A of FIG. 10 between times $t_1$ and $t_2$ while point $A_2A_3$ represents the spatial position of the image of point A of FIG. 10 between times $t_2$ and $t_3$.

This invention provides 3-D viewing without glasses for the audience when the tracking camera 1 is looking in any direction (up, down, left, right, forward and to the rear and any other angular relationship) relative to the camera's direction of motion which can be at most any angle except around the vertical as it must have a component of horizontal tracking motion.

In FIG. 12, stationary movie camera 1 (with film or electronic storage media) is shown capturing a laterally translating array of object points A, B and E at three distinct points in time $t_1$, $t_2$ and $t_3$. The subscript to A, B or E indicates the spatial location of A, B or E either at time $t_1$, $t_2$ or $t_3$. Therefore a subscript $A_1$ is the location of point A relative to camera 1 at time $t_1$. Although the translation direction is shown to the left in FIG. 12, it could be in any lateral direction in practice.

Figure 13:
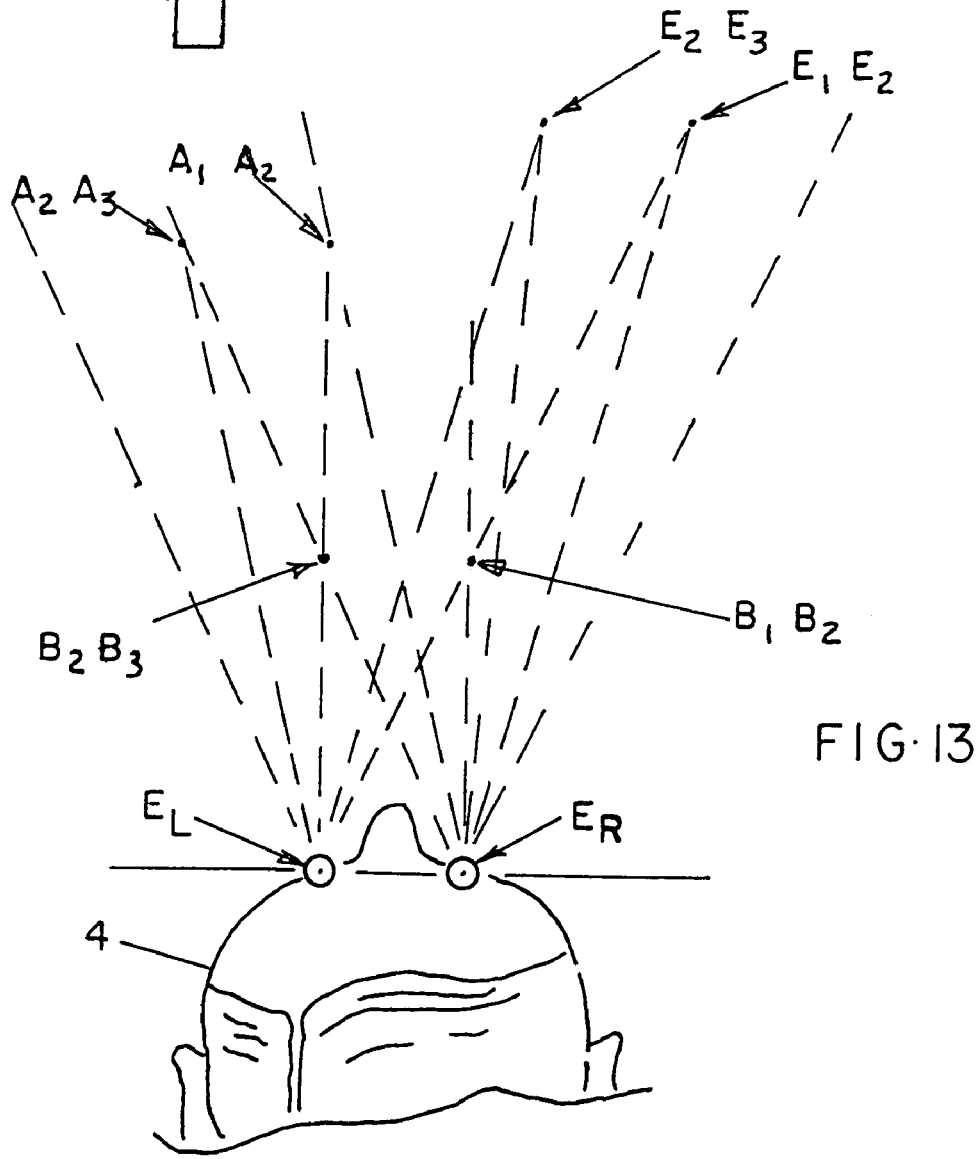
FIG. 13 shows a plan view of an arbitrary observer receiving collimated light in his left and right eyes from the direction of each image point in the scene relative to the fixed movie camera of FIG. 12.

FIG. 13 shows a plan view of the imaging geometry for an arbitrary observer 4 receiving identical collimated views corresponding to the ray angles captured in FIG. 12 at the three points of time $t_1$, $t_2$ and $t_3$ for laterally translating scene points A, B and E. The reference line for FIG. 13 is taken through the nodes of the two eyes ($E_L$ and $E_R$ of observer 4. This reference line is taken parallel to the direction of motion of the three object points A, B, E in FIG. 12. This ray construction is chosen for simplicity of illustration. Again, in practice, the translating objects can make any angle with respect to the image plane of camera 1 so that the image translation angle with respect to the chosen reference line in FIG. 13 can be any desired angle. Also, for simplicity, the capture times $t_1$, $t_2$ and $t_3$ are taken at three consecutive frame times for camera 1. In FIG. 13, any of the 12 rays are drawn by duplicating 6 rays for each eye ($E_L$ and $E_R$) of arbitrary observer 4 in like manner to the 6 rays captured during the three separate exposures of the imaging media (film or electronic) to the scene object emitted light for object points A, B, E. Because the 6 rays are duplicated for $E_L$ and $E_R$, it follows that the scene image must be collimated. Because the image is collimated for every person in the viewing space, all observers will see an identical picture and this picture will emulate what the camera 1 captured in FIG. 12. In FIG. 12, any ray is identified by either 1 or 2 letters with their corresponding subscripts (such as $B_1E_1$ or $E_2$). In FIG. 13, a given image point is determined by an intersection of two rays containing the same point (i.e., point B). The point $B_1B_2$, representing point B at a translated point in time, results from combining rays $B_1E_1$, with $A_1B_2$ (from FIG. 12) as an example. It is evident from FIG. 13 that the original scene made of left translating object points A, B and E of FIG. 12, is reproduced in left translation parallel to the chosen reference line through the two eyes of observer 4.

Figure 14A:
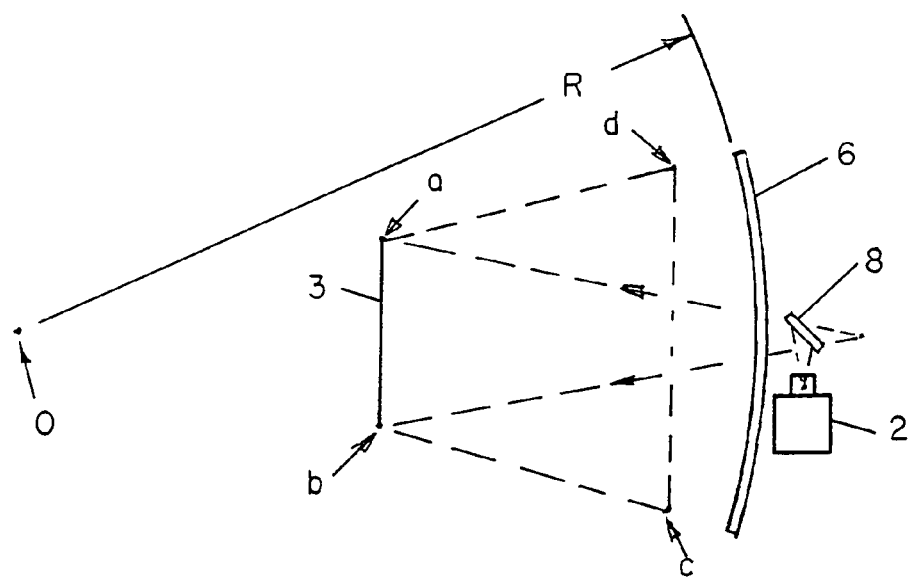
FIG. 14A is a plan view of the viewing parameters for another embodiment of a large audience projection system (similar to FIG. 7) where the projector is near the concaved mirror and projects a picture via a local flat mirror to revert the image left to right while projecting onto the screen behind the audience
Figure 14B:
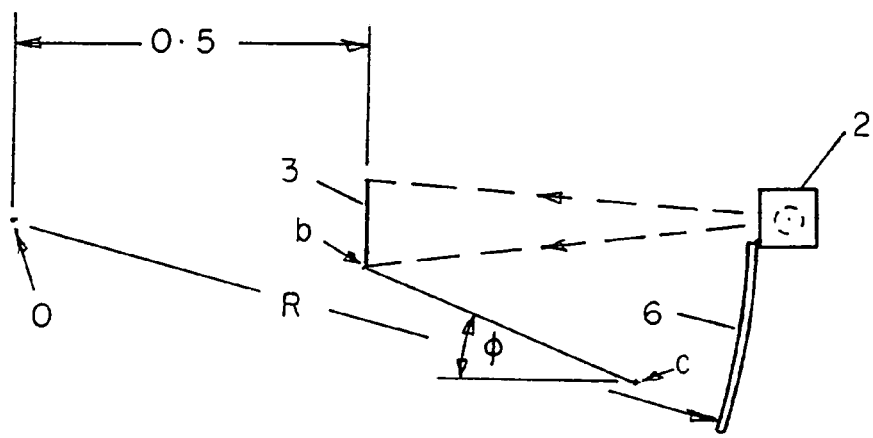
FIG. 14B is a side view of FIG. 14 A.

FIG. 14A is a plan view of an alternate embodiment of a large audience image generating projection system 2 and image collimator 6 which is identical to FIG. 7 except that screen 3 behind the audience is reflective in FIG. 14A and screen 5 is transmissive in FIG. 7. In addition, the projector 2 is relocated to the front of the auditorium in FIG. 14 where the image projected onto reflective screen 3 is laterally reversed by use of plane mirror 8 so that the right side of the image is on the right side of concaved mirror 6 as the observers look toward mirror 6. FIG. 14B is a side elevation view of FIG. 14A. In FIG. 7, the image is automatically laterally reversed to concaved mirror 6 so that observers looking toward the concaved mirror 6 in either FIG. 7 or FIG. 14 will see the final image oriented correctly and be able to read the title and credits on the screen. One advantage of the embodiment of FIG. 14 over FIG. 7 is that the folded nature of projection cuts the theatre length in half. A disadvantage might be that projection from front to back may bother some people as light rays tend to illuminate dust particles in the theatre. Mirror 8 in FIG. 14A can be dispensed with if an electronic projector 2 is used as that projector could be modified to reverse the horizontal scan direction.

If multi-theatres under a common roof are planned, the radial arrangement of about eight theatres allows a single light source at the center of the theatre complex (and center of curvature of the concaved mirror 6) to service all theatres simultaneously. This provision reduces cost of electrical power. Should the cost of power escalate, this method will be cost effective for multi-auditorium theatres. The high contrast translucent screen 5, of FIG. 7 eliminates the need for a flat lateral reversing mirror 8 as in the theatre of FIG. 14A.

FIG. 15 is identical to FIG. 14 and FIG. 7 except in the type of screen 9 used in FIG. 15 and also the elimination of projector 2. In screen 9, the picture elements are electronically controlled. FIG. 15A is a plan view while FIG. 15B is a side elevation view. Screen 9 along with its associated drive electronics, constitute an image generator (to replace a projector) in this embodiment of our invention. Screen 9 can be constructed of active self emitting picture elements from a screen electronically controlled as with various conventional flat panel displays consisting of the following but not limited to: plasma, electroluminescent; light emitting diodes; Microbead or Microtip; edge illuminated shuttered panel with sequential use of rapidly changing colored lights (as red, green and blue); fiber optics with spatially arranged fibers to carry a remote small image to the larger surface. Screen 9 can also be constructed of passive picture elements and rear lighting in which a modulating "passive" transparent surface such as liquid crystal and could be back-lit by a diffusing light source.

The purpose of FIG. 16A is to determine the optical relationships of key parameters in the projection system using the collimating mirror 6 such as: the radius (R) of the concaved mirror 6; its focal length (F); the position of the screen 5 from the mirror's node n (distance A) and the virtual image location (B) in space measured from the mirror's node n. FIG. 16A shows the layout of these parameters. The following is a listing of the mirror's basic imaging formulas.

$$B=(M-1)F=FA/(F-A)=AM$$

$$A=B/M=F-F/M=FB/(F+B)$$

$$M=B/A=F/(F=A)=(B+F)/F, \text{ where } M=\text{magnification between the screen 5 and the virtual image of the screen } 5i$$

$$F=\text{sphere radius}/2=AM/(M-1)=B/(M-1)=AB/(B-A)$$

The rule is that A=F (is ideal); A less than F (is ok); A greater than F (is not allowed)

In setting up the projection system, measure the distance between the mirror's 6 node n and the screen 5 to be "A"=50 feet (assume an ideal radius (R) of the sphere=100 ft and the focal length (F) of the sphere=50 ft). Calculate how much "F" can grow from 50 ft (if A is set to 50 ft.) to give a virtual image −5i greater than 716 ft from the mirror's node-n.

If "A" is set to 50 ft, in order to have the image 716 ft behind the concaved mirror's node-n, the focal length (F) of mirror 6 must increase to 53.75 ft. and the radius of the mirror R would increase by 7.5 ft or 90 inches or 7.5%. This knowledge is helpful in the construction of the molded mirror 10 shape which would have a +90 inch −0 inch tolerance on its specified radius of 100 ft.

FIG. 16B shows a typical observer 4 with his two eyes ($E_L$ & $E_R$) separated by about 2.5 inches (on average) viewing a distant point 5i in space such that his two eyes converge with an angle of one minute of arc (shown as angle α in FIGS. 16B—the minimum angle for a 20—20 viewer to resolve between 2 elements in close proximity in space). The distance to the convergent point calculates to 716 feet. Therefore, we want the virtual image 5i caused by the theatre optics of FIG. 16A to be at least 716 feet in space but ideally at infinity. Infinity viewing of the virtual image occurs only if screen 5 is placed exactly in the focal plane F of concaved mirror 6 (which is one-half the radius of curvature of mirror 6).

Figure 17A:
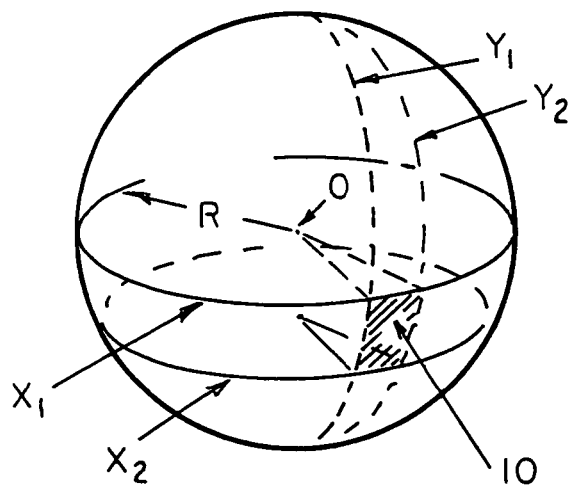
FIG. 17A shows how a mirror tile is extracted from a globe for a small portion of the concaved mirror.
Figure 17B:
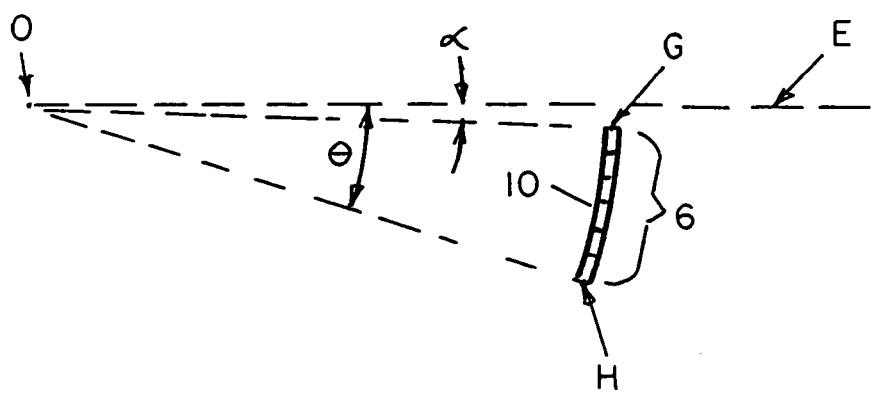
FIG. 17B shows a side view of the location of the top and bottom of the concaved mirror for a 200 seat theatre.

FIG. 17A uses a sketch of a sphere of radius R and center at o to show the general means to identify a mirror tile 10 shape by employing both latitude lines (x1, x2) and longitude lines (y1, y2). As shown in FIG. 17B and FIG. 20, the final concaved mirror 6 is a "segmented" mirror constructed of a matrix of mirror tiles 10. The shape of all mirror tiles 10 needs to be programmed into the LASER peripheral trimmer. It has been determined that all four sides of the mirror-tile 10 shape can be approximated by straight lines because of the long radius of curvature and the small size of mirror tile 10. The final shape of mirror tiles 10 resembles a trapezoid.

In FIG. 17A for a 200 seat theatre with a 100 foot radius R sphere, the longitude lines y1 and y2 are 1.875 degrees apart and the latitude lines x1 and x2 are 2.583 degrees apart. The shaded portion between the latitude and longitude lines represents a typical mirror tile 10.

FIG. 17B shows a side view of the completed concaved mirror 6 of radius R with its center of curvature at point o. Segmented concaved mirror 6 is shown after the assembly of a matrix of all of the mirror tiles 10 of which there are 6 mirror tiles 10 running from the top of mirror 6 at point G to the bottom of mirror 6 at point H for a total of 6 rows of mirror tiles 10 with each row containing about 16 identical mirror tiles 10 for any particular row. This assembly of the mirror tiles 10 is shown in FIG. 20 A. Although 6 rows of mirror tiles 10 are shown for a 200 seat theatre, the total quantity of mirror tiles 10 in the final concaved mirror 6 assembly matrix of mirror tiles 10 can vary depending on audience size and the slope of the seating floor.

FIG. 17B shows "vertical" information in a side view of the geodesic structure (concaved mirror 6). The final large concaved mirror 6 (constructed of 99 mirror-tiles 10) resides between latitude negative 2 degrees at its top G and negative 17.5 degrees at its bottom H. This arc length from G to H at the 1200 inch radius is 324.631 inches which if divided by 6 (for the 6 rows of mirror tiles 10) equals 54.1 inches for the arc height of one mirror tile 10. All mirror tiles 10 have the same height. Although mirror tiles 10 are completely identical in any given horizontal row, the width of mirror tiles 10 changes slightly between the 6 rows and therefore there are 6 different sizes of mirror tiles 10 in the concaved mirror 6 assembly matrix of mirror tiles 10.

Figure 17C:
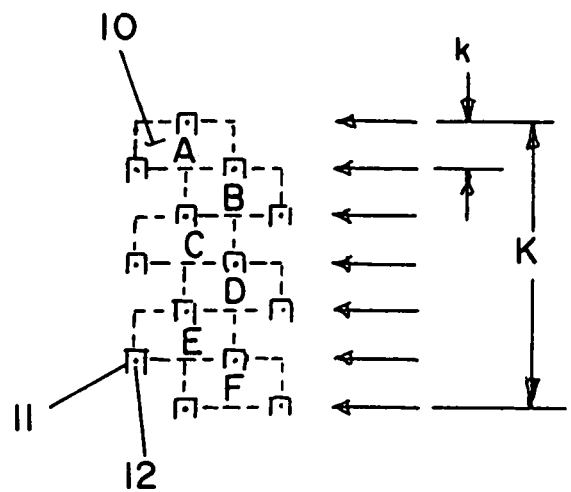
FIG. 17C shows the front view of how a vertical array of mirror tiles are arranged in a geodesic structure for a portion of the concaved mirror.

FIG. 17C shows how U-pins 11 are employed to capture the mirror tiles 10 to the geodesic structure made of nodes 12 and struts 13 (detailed in FIG. 19) which forms concaved mirror 6. FIG. 17C shows a U-pin 11 (detailed in FIG. 21) at each node 12 (detailed in FIG. 19). Any U-pin locks 3 mirror tiles 10 together as shown in FIG. 17C. There are a total of 99 mirror tiles 10 and 121 U-pins 11 and 121 nodes 12 (where the concaved mirror-6 aluminum struts 13 come together in 6 places—reference FIG. 19). FIG. 17C shows the total height K of the assembly of 6 mirror tiles 10, where each mirror tile's 10 height in each row is k and K=6 k.

FIG. 18A shows the back view of mirror tile 10. Point n is the center of the mirror tile 10 (the lowest point on the spherical surface connecting with the center of curvature of concaved mirror-6). The single slot "a" is contained in an upper ledge of mirror tile 10 and the upper ledge points toward the mirror tile 10 center of curvature. The dual slots "b" are contained in a lower ledge of the mirror tile 10 where the lower ledge also points toward the mirror tile 10 center of curvature. All a and b slots will each receive U-pin 11. Notches c and d in the top and bottom ledges of mirror-tile 10 respectively, and the bottom of the surface containing notch d, are all used as reference elements for correctly positioning mirror tile 10 for the LASER cutting operation that will trim mirror tile 10 so that all mirror tiles 10 fit into the completed concaved mirror-6 assembly of matrix mirror tiles 10. In FIG. 18A, a thin reflective mirror sheet 15 is shown attached (via adhesive) to the front of mirror tile 10

FIG. 18B, shows the front of mirror tile 10. After mirror tile 10 is molded, a reflective thin mirrored sheet 15 is glued onto the front of mirror tile 10 (via a vacuum bag to assure that the mirror surface follows the molded mirror tile 10 concaved surface with a 100 foot radius). A suitable adhesive is Lord Corporation's 7422 one part Urethane. Mirror sheet 15 may be an acrylic mirror about 1/16 inch thick or a super 8 non-directional 20 gage mirrored stainless steel sheet or even a reflective mylar sheet (without print-through features). The dashed line represents the final LASER cut-line for the trapezoid mirror tile 10 shape to be performed at a later time. There are 6 different shapes of mirror tiles 10 all with the same height but with varied widths in a trapezoid shape and all made from the same mold.

The lamination of the reflective mirror sheet 15 to the molded mirror tile 10 form involves the adhesive preparation and application followed by the vacuum bag processes where the mirror sheet 15 is held in contact against the spherical molded surface by vacuum pressure until the adhesive has properly gelled.

Figures 23, 24:
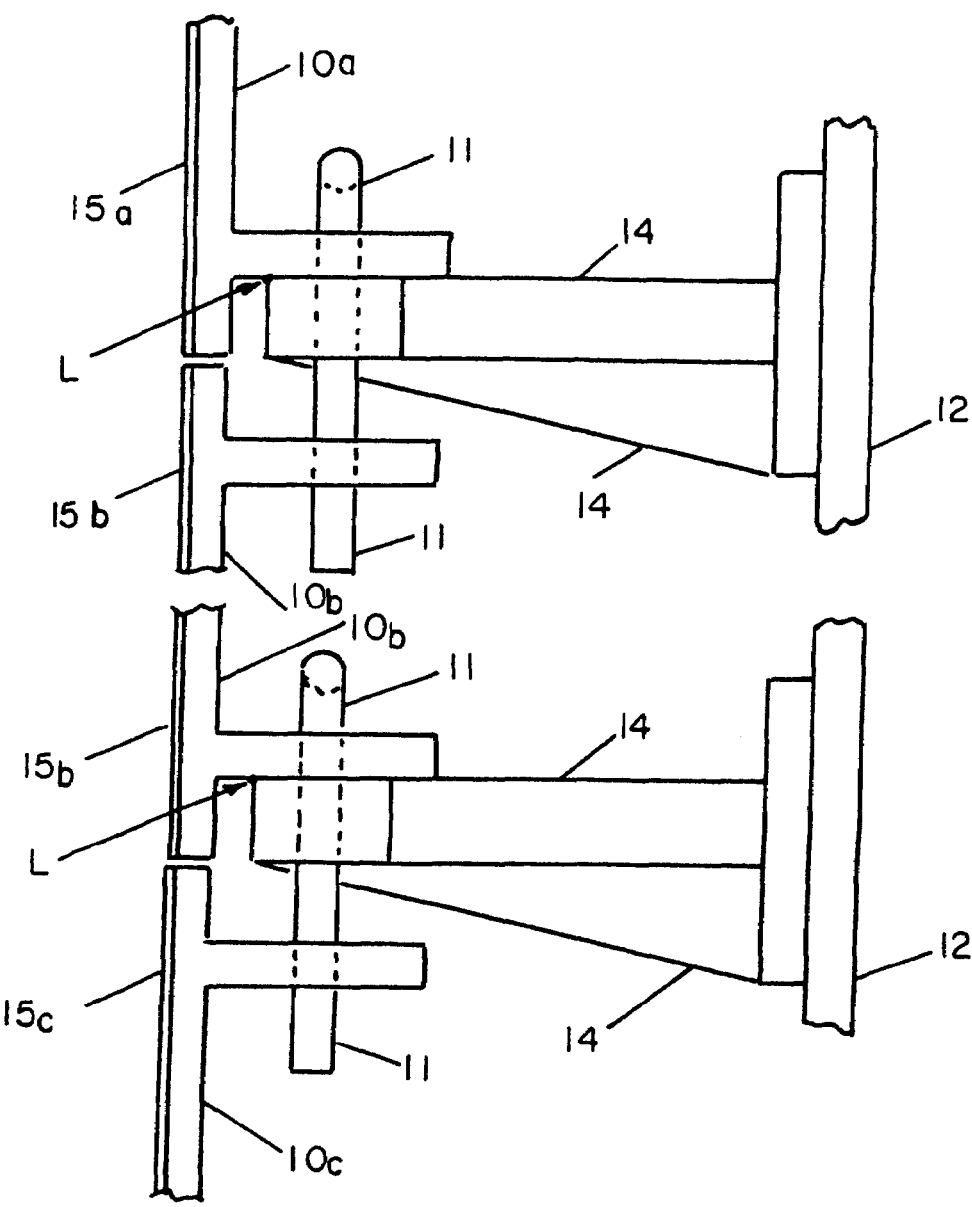
FIG. 23 shows a side view of the assembly of 3 adjacent mirror tiles into the geodesic structure.
FIG. 24 shows a side view of the final concaved mirror for a 200 seat theatre installed on a concrete slab resting on the ground.

The key element in our invention is the large spherically concaved mirror 6 at the front of the audience. The means to achieve this large mirror is to build its surface area (about 26 ft×52 ft) out of mirror tiles 10. A quantity of 99 mirror tiles 10, each about 41 inch×55 inch in size, are required for a 200 seat theatre in order to have a reasonable mirror tile 10 size for ease of assembly. FIG. 19 through FIG. 22 inclusive show the major parts of the structure required to assemble all of these tiles to form the large concaved mirror 6. The major parts of the concaved mirror 6 assembly are: 99 mirror tiles 10 (shown in FIG. 18), 121 nodes with 6 struts 13 per node (shown in FIG. 19), 121 U-Pins 11 (shown in FIG. 21) and 121 Diving Boards 14 (shown in FIG. 22). The assembly of these components is shown in FIG. 20 and FIG. 23 with the final structure shown in FIG. 24.

The concaved mirror 6 geodesic structure is made of aluminum struts 13 arranged in triangles with the apex of the triangle called a "node" 12 shown in FIG. 19. Each node has 6 struts 13 connected to it. There are 121 nodes in the construction of a 200 seat theatre as shown in the FIG. 20 mirror tile 10 array making the concaved mirror matrix assembly 6. Our first theatre will seat 200 people and the concaved mirror 6 assembly of 99 mirror tiles 10 will have a radius of 1200 inches and will occupy the space between longitudes 0 and 30 degrees and between latitudes minus 2 and minus 17.5 degrees. FIG. 19A shows a plan view of node 12 with struts 13 and FIG. 19B shows a front view of a typical node 12 of the structure with the 6 struts 13 attached. In the center of node 12 is a 3.5 inch diameter "flat" area F onto which diving board 14 will be attached (the diving board is detailed in FIG. 22). There are 4 bolt holes (a,b,c,d) and 2 locator pin 19 holes (e & f—one at 12 o'clock and one at 6 o'clock) in this "flat" area (ref FIG. 22). A typical bolt 20 is shown for reference in FIGS. 19A & B.

FIG. 19A shows the plan view of aluminum gusset node 12 (about 3/8 inch thick) which is very slightly formed (with a radius of curvature of about 100 feet) into a conical surface for attachment of the 6 mirror structs 13 (shown in their method of attachment by bolting). In FIG. 19B, the front view of the node 12 is shown with the 6 mirror struts 13 with bolts 20 attaching struts 13 to node 12. The diameter of node 12 is about 14.2 inches. The central portion of node 12 is not conical but is a flat surface F about 3.5 inches in diameter against which a diving board 14 (FIG. 22) will be attached using two locator pins 19 through the 6 O'clock and 12 O'clock holes (shown in FIGS. 22B & C) and the 4 bolts 20 shown. The diving board 14 is detailed in FIG. 22 and is shown in assembly with mirror tile 10, node 12 and U-pin 11 in FIG. 23.

FIG. 20 shows an assembly of all 99 of the mirror tiles 10 and that each mirror tile 10 will attach to a single node 12 at top center (slot a of FIG. 18) and attach to two additional nodes 12 at mirror tile's 10 base (1 on the right and 1 on the left bottom corner using slots b of mirror tile 10). Each of the 121 nodes 12 will capture 3 mirror tiles 10. FIG. 20 shows that 6 rows of mirror tiles 10 are required for a 200 seat theatre. The height of the mirror tiles 10 in all 6 rows will be identical but as the rows progress downward the width decreases slightly due to the fact that all mirror tiles 10 are on a sphere shape in the negative latitudes. The final sizing of the mirror tiles 10 will be done by a LASER cutter to plus or minus 0.005 inch accuracy after the acrylic mirror 15 (reference FIG. 18) is laminated to the molded mirror tile 10 concaved surface.

Each of the mirror tiles 10 will have a concaved reflective spherical shape with a 100 foot radius of curvature. As in FIG. 17B, the top G of the concaved mirror assembly 6 is located at negative 2 degrees latitude and the bottom H of the concaved mirror assembly 6 is located at negative 17.5 degrees latitude. Each mirror tile 10 height will be identical and equal to 1/6 of (17.5–2) degrees.

FIGS. 21 A, B and C, respectively are showing the plan, side and end views of the U-pin 11. The diameter d of U-pin 11 is 0.25 inch and the height h and width w of U-pin 11 is 5 inches as measured between the centerline of each of the downward prods of the U-shape. The assembly of the U-pin 11 into the concaved mirror assembly 6 of 99 mirror tiles 10 is shown in FIG. 23.

The U-pin 11 is so named because of its "U"-shape. Its purpose is to capture mirror tiles 10 to the geodesic structure (concaved mirror 6) and hold mirror tile 10 at the proper attitude to assure the integrity of concaved mirror's 6 continuous spherical surface. The U-pin 11 prods will go through slots a and b on mirror tile 10 (reference FIG. 18A) and then into holes g and h on diving board 14 (reference FIG. 22B). This assembly of mirror tile 10, U-pin 11 and diving board 14 is shown in FIG. 23. Since diving board 14 is attached directly to any of the 121 nodes 12 of the geodesic structure (concaved mirror 6), when the U-pins 11 go through the slots a & b on the molded mirror tile 10 and through holes g & h on diving board 14, mirror tile 10 is captured to the geodesic structure (concaved mirror 6).

FIG. 22 A shows a front view of diving board 14. FIG. 22B shows a plan view of diving board 14. FIG. 22C shows a side view of diving board 14. Diving board 14 is a partly molded and machined part with two pressed in locating steel pins 19 pressed into holes e & f in FIG. 22A. These locating pins 19 are in the circular flange section of the diving board 14 as shown in FIG. 22A. The circular flange section is 3.5 inches in diameter and butts against the 3.5 inch flat area F of node 12 (described and shown in FIG. 19B). Bolt holes a, b, c, and d shown in FIG. 22A allow bolts to capture diving board 14 to node 12. Each of the nodes 12 (on the concaved side) have a diving board 14 protruding from its center area and normal to the flat surface F of node 12. The base of mirror tile 10 will rest on diving board 14 and be captured by U-pin 11 as shown in the assembly drawing FIG. 23. The separation distance W between the centers of 0.25 inch diameter holes g and h in FIG. 22B is 5 inches and receives the two prods of U-pin 11. Surfaces S1 and S2 of the diving board 14 of FIG. 22C are machined accurately to be mutually perpendicular. Section A—A of FIG. 22B is shown as FIG. 22C. The angled portion of diving board 14 shown in side view in FIG. 22C and in front view FIG. 22 A, has the purpose of strengthening diving board 14 to sustain a load of about 50 Lbs from the weight of mirror tile 10.

After the geodesic structure (concaved mirror 6) with the 121 diving boards 14 is set up in the theatre, the only operation remaining is to attach the mirror tiles 10 to the geodesic structure (concaved mirror 6). The quantity of basic elements required for attachment are: 121 U-pins 11; 99 mirror tiles 10; 2 assemblers in 2 mechanical lifts.

Two separate lifts (each with a bucket to hold a person and which is typically used by construction workers to reach high altitudes) is used in this case to lift the 99 mirror tiles 10 into position on the concaved mirror structure 6. One assembler is in the front lift bucket with a mirror tile 10 and another assembler is in the rear lift bucket with 121 U-pins 11 (1 for each node 12 of the geodesic structure—concaved mirror 6). When the front assembler sets a mirror tile 10 on a diving board 14 attached to node 12, the rear assembler inserts U-pins 11 to capture the mirror tile 10 in 3 places (3 nodes 12 per mirror tile 10—ref. FIG. 20). With 121 U-pins 11 anchored in 121 nodes 12 and into 121 diving boards 14, all of the mirror tiles 10 are captured into the geodesic structure—concaved mirror 6.

FIG. 23 shows a side view in the assembly of 3 mirror tiles 10. They are shown as (10a, 10b and 10c), running from the top to the bottom, respectively. FIG. 23 shows more clearly how the mirror tiles 10 are captured to the geodesic structure concaved mirror 6. The mirror tiles 10 are captured at nodes 12 by means of the U-pin 11 and diving board 14.

At the top of FIG. 23, the bottom ledge of mirror tile 10a is shown resting on a diving board 14 and pinned in place by U-pin 11 which passes through one of the slots b from FIG. 18A at the base of mirror tile 10a. U-pin 11 continues through the two holes g and h in diving board 14. Only one of the holes in diving board 14 is shown for clarity and receives one of the U-pin prods. The second hole in diving board 14 is hidden from view behind the foremost hole in diving board 14. U-pin 11 continues through diving board 14 and into slot a from FIG. 18A at the top ledge of the next mirror tile 10b in the array of mirror tiles 10 shown in FIG. 20. This second mirror tile 10b beneath the top mirror tile 10a is cut away in FIG. 23 so that the exact assembly of the next set of mirror tiles, one above and one beneath each other, can be repeated as described above. In reality there is a slight spherical curve (a radius of 100 feet) to the front of each mirror tile 10 as they are assembled as shown in FIG. 23, such that each of the diving boards 14 points toward the center of curvature o from FIG. 7 of mirror tiles 10 to form the final geodesic concaved mirror 6 shown in FIG. 7 and which is shown also in several of the other figures in this specification. In addition, the arrow L in FIG. 23 points to a line element made by the intersection of the diving board 14 top protruding surface S2 (reference FIG. 22C) with its end surface S3 (also shown in FIG. 22C) such that this line element L will be parallel with the ground 18 (reference FIG. 24) for all 121 of the diving boards 14. The overlayed reflecting surface 15 of the concaved mirror 6 is also applied to each of the mirror tiles 10. Mirror tile 10a has reflective overlay 15a while mirror tile 10b has reflective overlay 15b and mirror tile 10c has reflective overlay 15c, etc.

FIG. 24 shows the final assembly of the geodesic structure concaved mirror 6 as it will rest on the floor of the theatre (represented by the ground 18) in front of the audience. The center of curvature of mirror 6 is at o on equator E at a height H=30 feet above the ground 18. The top of concaved mirror 6 is at latitude negative 2 degrees represented by angle α and the bottom of the mirrror 6 is at latitude negative 17.5 degrees represented by angle θ. The radius of concaved mirror 6 is R=100 feet. Supporting members 16 attach to concaved mirror 6 and are anchored into the cement slab 17 resting on the ground 18. This will hold the concaved mirror 6 at the proper attitude for audience viewing.

Note: Although this specification has called out numerous dimensions and angles, it is understood that many other dimensions and angles can also be designed into our invention but that those mentioned here are merely those that we have chosen for the test theatre seating only 200 people.

The invention claimed is:

1. An apparatus comprising:
   a screen located substantially at the focal surface of a spherical concaved mirror of radius R;
   a viewing volume located between the screen and the spherical concaved mirror such that an observer's pair of eyes in the viewing volume can see a reflection from the spherical concaved mirror of a scene displayed on the screen, wherein:
      the screen, in relation to the observer's pair of eyes in the viewing volume, has a spherically convex surface of radius R/2;
      the spherically concave mirror has a radius of R;
      the screen and the spherically concave mirror are separated by a distance of at least R/2;
      the spherically concave mirror and the spherically convex screen have a common center of curvature; and
      any observer at substantially all locations within the viewing volume can see a three dimensional view of the scene displayed on the screen.

2. The apparatus as defined in claim 1, wherein the observer's left and right eyes in the viewing volume will see any point in the scene displayed on the screen as reflected in the mirror with about 1 arc minutes difference between each said eye.

3. The apparatus as defined in claim 1, wherein the observer's left and right eyes in the viewing volume will see any point in the scene displayed on the screen as viewed in the mirror as appearing to be at a distance of beyond 716 feet from the screen.

4. The apparatus as defined in claim 1, wherein: the spherical concaved mirror is composed of a mosaic of spherical concaved mirrors.

5. The apparatus as defined in claim 1, wherein when the scene was captured by a motion picture camera, and the scene and the motion picture camera had a component of relative horizontal motion one to the other, then the observer's pair of eyes in the viewing volume sees the reflection from the spherical concaved mirror of the scene displayed on the screen, and an identical image of the scene is reflected from the spherical concaved mirror so as to be received at similar locations on the retina of each eye of the viewer.

6. An apparatus comprising:
   a spherically concave mirror of radius R;
   a screen located substantially at the focal surface of the spherical concaved mirror; and
   an area for a plurality of observers between the screen and the mirror such that each said observer in the area can see a substantially collimated reflection of an image on the screen that is reflected from the mirror to each said observer in the area; wherein:
      the screen, in relation to the observer's pair of eyes in the area, has a spherically convex surface of radius R/2;
      the spherically concave mirror has a radius of R;
      the spherically concave mirror and the spherically convex screen have a common center of curvature;
      the screen and the spherically concave mirror are separated by a distance of at least R/2; and
      substantially all the observers in the area between the screen and the mirror can see a three dimensional view of the image on the screen.

7. The apparatus as defined in claim 6, wherein the spherically concaved mirror comprises a plurality of mirror tiles.

8. The apparatus as defined in claim 6, wherein when:
the screen located behind each said observer shows a scene that was captured by a motion picture camera;
the scene and the motion picture camera had a component of relative horizontal motion one to the other; and
each said observers' pair of eyes sees a reflection of the scene in the concaved mirror, then:
an identical image of the scene is reflected from the concaved mirror so as to be received at similar locations on the retina of each eye of each said observer.

9. The apparatus as defined in claim 6, wherein the screen shows a scene that is projected from the rear of the screen.

10. The apparatus as defined in claim 6, wherein the observer's pair of eyes will see any point in the scene displayed on the screen with about 1 arc minutes difference between each said eye.

11. The apparatus as defined in claim 6, wherein the screen comprises rear lit passive picture elements.

12. The apparatus as defined in claim 6, wherein the screen comprises active self emitting picture elements.

13. A movie theater comprising:
a screen located between the front and back of the movie theater;
a spherically concave mirror proximal the front of the movie theater and composed of a plurality of spherically concave mirrors; and
a viewing volume located between the screen and the mirror such that:
each observer in the viewing volume can see in their respective pair of eyes a reflection in the mirror of a scene that is displayed on the screen; and
any observer at substantially all locations within the viewing volume can see a three dimensional view of the scene displayed on the screen, wherein:
the screen has a spherically convex shape having a radius of R/2;
the spherically concave mirror has a radius of R; and
the screen is separated from the mirror by a distance of at least R/2.

14. The movie theater as defined in claim 13, further comprising a floor having a surface declining downwards from the back to the front of the movie theater and having an area for seating.

15. A motion picture theater comprising:
a substantially spherical convex screen;
means for making moving pictures visible on the screen;
a substantially spherical concave mirror; and
an area for a distribution of movie watchers located between the substantially spherical convex screen and the substantially spherical concave mirror, wherein for each said movie watcher:
a substantially identical reflection from the substantially spherical concave mirror of the moving pictures on the substantially spherical convex screen will be received at the movie watcher's retinas; and
substantially all of the movie watchers in the area can see a three dimensional view of the moving pictures; wherein the area for a distribution of movie watchers is a trapezoid with its longest edge nearest said substantially spherical concave mirror.

16. The motion picture theater as defined in claim 15, wherein the area for the distribution of movie watchers is suitable for a stadium seating arrangement.

17. The motion picture theater as defined in claim 15, wherein each said movie watcher's left and right eyes will see any point in any said moving picture visible on the screen as reflected in the substantially spherical concave mirror with about 1 arc minutes difference between each said eye.

18. The motion picture theater as defined in claim 15, wherein each said movie watcher's left and right eyes will see any point in any said moving picture visible on the screen as viewed in the substantially spherical concave mirror as appearing to be at a distance of beyond 716 feet from the screen.

19. The motion picture theater as defined in claim 15, wherein the substantially spherical concave mirror is composed of a plurality of spherical concaved mirrors.

20. The movie theater as defined in claim 15, wherein each said moving picture visible on the screen includes a picture having horizontal movement relative to a camera that took the picture.

21. The motion picture theater as defined in claim 20, wherein an intersecting of optical rays from any given point in one said moving picture visible on the screen can be used to determine the spatial location of said point in the one said moving picture visible on the screen in the area for the distribution of movie watchers, whereby the brain of any given movie watcher in the area for the distribution of movie watchers can cognize the depth information already contained in the moving pictures visible on the screen as the brain cognizes the horizontal motion of the moving pictures visible on the screen relative to the camera.

22. A motion picture theater comprising:
a substantially spherical mirror having a radius of R;
a substantially flat screen located at a distance of R/2 from the center of the substantially spherical mirror;
an area, between the screen and the mirror, for a distribution of theater patrons; and
means for making a substantially identical reflection of moving pictures on the screen from the mirror to the respective retinas of each said theater patrons in the area, wherein substantially all theater patrons in the area can perceive the moving pictures in three dimensions.

* * * * *